United States Patent
Carter et al.

(10) Patent No.: US 10,791,779 B2
(45) Date of Patent: Oct. 6, 2020

(54) POLYMER MICROWEDGES AND METHODS OF MANUFACTURING SAME

(71) Applicant: THE CHARLES STARK DRAPER LABORATORY, INC., Cambridge, MA (US)

(72) Inventors: David J. Carter, Concord, MA (US); Tirunelveli S. Sriram, Acton, MA (US); Parshant Kumar, Stoneham, MA (US); Clayton Morris, Norfolk, MA (US); William W. McFarland, Waltham, MA (US); Eugene H. Cook, Acton, MA (US); John LeBlanc, North Andover, MA (US); Alla Gimbel, Medford, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 339 days.

(21) Appl. No.: 15/534,907

(22) PCT Filed: Dec. 9, 2015

(86) PCT No.: PCT/US2015/064791
§ 371 (c)(1),
(2) Date: Jun. 9, 2017

(87) PCT Pub. No.: WO2016/094557
PCT Pub. Date: Jun. 16, 2016

(65) Prior Publication Data
US 2017/0367418 A1  Dec. 28, 2017

Related U.S. Application Data

(60) Provisional application No. 62/090,337, filed on Dec. 10, 2014, provisional application No. 62/090,265, filed on Dec. 10, 2014.

(51) Int. Cl.
*A41D 19/015* (2006.01)
*B29C 45/37* (2006.01)
(Continued)

(52) U.S. Cl.
CPC .... *A41D 19/01564* (2013.01); *B29C 33/3842* (2013.01); *B29C 33/424* (2013.01);
(Continued)

(58) Field of Classification Search
CPC .......... A41D 19/01564; B29C 33/3842; B29C 33/424; B29C 33/58
(Continued)

(56) References Cited

U.S. PATENT DOCUMENTS 1,470,442 A * 10/1923 Grosjean .............. B29D 35/124
264/258
1,727,412 A * 9/1929 Roberts ................. B29C 33/123
264/277
(Continued)

FOREIGN PATENT DOCUMENTS

EP      2444226 A2    4/2012
WO   2007095214 A2    8/2007
(Continued)

OTHER PUBLICATIONS

Parness et al., A microfabricated wedge-shaped adhesive array displaying gecko-like dynamic adhesion, directionality and long life, Mar. 18, 2009, Journal of the Royal Society (2009) 6, 1223-1232 (Year: 2009).*
(Continued)

*Primary Examiner* — Jason L Vaughan
(74) *Attorney, Agent, or Firm* — Lando & Anastasi, LLP

(57) ABSTRACT

A mold for casting a micro-scale structure includes an upper surface including a first cavity having a first depth. A negative pattern for an array of micro-scale structures is
(Continued)

defined in a surface of the first cavity. The mold includes at least one second cavity having a second depth defined in the cavity outside of the negative pattern for the array of micro-scale structures. The at least one second cavity defines a negative pattern for a standoff of the micro-scale structure. A fabric retaining frame is disposed in the first cavity.

24 Claims, 28 Drawing Sheets

(51) Int. Cl.
| | |
|---|---|
| B29C 33/42 | (2006.01) |
| B29C 37/00 | (2006.01) |
| B29C 39/02 | (2006.01) |
| B29C 39/10 | (2006.01) |
| B29D 99/00 | (2010.01) |
| B29C 33/38 | (2006.01) |
| B29C 33/58 | (2006.01) |
| B29C 39/26 | (2006.01) |
| B29L 31/48 | (2006.01) |
| B29C 59/02 | (2006.01) |
| B29K 75/00 | (2006.01) |
| B29K 105/00 | (2006.01) |

(52) U.S. Cl.
CPC .......... B29C 33/58 (2013.01); B29C 37/0053 (2013.01); B29C 39/026 (2013.01); B29C 39/10 (2013.01); B29C 39/26 (2013.01); B29C 45/372 (2013.01); B29D 99/0067 (2013.01); B29C 2059/023 (2013.01); B29K 2075/00 (2013.01); B29K 2105/0097 (2013.01); B29K 2863/00 (2013.01); B29K 2891/00 (2013.01); B29L 2031/4864 (2013.01)

(58) Field of Classification Search
USPC .................. 264/324, 325, 169; 156/73.5, 80
See application file for complete search history.

(56) References Cited

U.S. PATENT DOCUMENTS

| | | | | |
|---|---|---|---|---|
| 2,010,827 A * | 8/1935 | Ray | ........................ | A43B 13/39 |
| | | | | 264/160 |
| 2,101,015 A * | 12/1937 | Anderson | ............ | B30B 15/024 |
| | | | | 425/405.2 |
| 2,276,321 A * | 3/1942 | Lindahl | .................... | A44B 1/24 |
| | | | | 24/114.8 |
| 2,620,016 A * | 12/1952 | Adams, Jr. | ................. | F16G 5/20 |
| | | | | 264/258 |
| 3,607,590 A | 9/1971 | Califano et al. | | |
| 3,678,147 A * | 7/1972 | Patchen | .............. | B29C 33/0033 |
| | | | | 264/325 |
| 4,946,640 A * | 8/1990 | Nathoo | ................. | B29C 51/082 |
| | | | | 264/316 |
| 5,326,523 A | 7/1994 | Gustavel et al. | | |
| 5,637,272 A * | 6/1997 | Yamamoto | .......... | B29C 33/0033 |
| | | | | 264/156 |
| 5,927,778 A * | 7/1999 | Uytterhaeghe | ......... | B29C 43/18 |
| | | | | 264/154 |
| 6,004,650 A * | 12/1999 | Schweizer | ............ | B29C 70/081 |
| | | | | 264/257 |
| 6,676,782 B2 * | 1/2004 | Chi | ........................ | A43B 3/122 |
| | | | | 156/245 |
| 7,709,087 B2 * | 5/2010 | Majidi | ...................... | C09J 7/00 |
| | | | | 428/365 |
| 7,764,004 B2 * | 7/2010 | Aizenberg | ............ | B81B 3/0032 |
| | | | | 310/311 |
| 8,153,254 B2 * | 4/2012 | Arzt | ........................ | B25J 15/00 |
| | | | | 428/397 |
| 8,424,474 B2 * | 4/2013 | Berns | .................... | A41D 27/24 |
| | | | | 112/475.09 |
| 8,524,092 B2 * | 9/2013 | Sitti | .................... | A44B 18/0049 |
| | | | | 216/11 |
| 8,563,117 B2 * | 10/2013 | Messersmith | .............. | C08J 7/12 |
| | | | | 428/142 |
| 8,703,032 B2 * | 4/2014 | Menon | ................ | B29C 33/3878 |
| | | | | 264/227 |
| 8,961,855 B2 * | 2/2015 | Ho | ........................ | B81C 1/00111 |
| | | | | 216/103 |
| 8,974,904 B2 * | 3/2015 | Dai | ........................ | B82Y 30/00 |
| | | | | 423/448 |
| 9,332,991 B2 * | 5/2016 | Pereira | .................... | A61L 15/42 |
| 9,908,266 B2 * | 3/2018 | Cutkosky | ............ | B29C 33/3857 |
| 9,963,616 B2 * | 5/2018 | Menon | ................ | B29C 33/3878 |
| 10,005,103 B2 * | 6/2018 | Arzt | ........................ | B82Y 10/00 |
| 10,029,082 B2 * | 7/2018 | Ross | ................ | A61M 37/0015 |
| 10,118,315 B1 | 11/2018 | Cheng et al. | | |
| 10,316,220 B2 * | 6/2019 | Hawkes | ........................ | C09J 7/00 |
| 2004/0012118 A1 * | 1/2004 | Perez | ........................ | B32B 5/26 |
| | | | | 264/257 |
| 2004/0012121 A1 * | 1/2004 | Lang | ........................ | B29C 43/00 |
| | | | | 264/325 |
| 2006/0005362 A1 * | 1/2006 | Arzt | ........................ | B25J 15/00 |
| | | | | 24/442 |
| 2006/0110845 A1 | 5/2006 | Guo et al. | | |
| 2006/0131265 A1 * | 6/2006 | Samper | ............... | B81C 99/0095 |
| | | | | 216/41 |
| 2006/0276095 A1 * | 12/2006 | Dua | ........................ | A43B 7/125 |
| | | | | 442/400 |
| 2006/0282936 A1 | 12/2006 | Olson et al. | | |
| 2007/0231541 A1 | 10/2007 | Humpal et al. | | |
| 2008/0116168 A1 * | 5/2008 | Samper | ............... | B81C 99/0095 |
| | | | | 216/41 |
| 2008/0169059 A1 * | 7/2008 | Messersmith | .............. | C08J 7/12 |
| | | | | 156/249 |
| 2009/0022941 A1 | 1/2009 | Fischer et al. | | |
| 2009/0297776 A1 * | 12/2009 | Crosby | ............... | B29C 33/3842 |
| | | | | 428/152 |
| 2010/0136281 A1 * | 6/2010 | Sitti | .................... | A44B 18/0049 |
| | | | | 428/92 |
| 2010/0252177 A1 * | 10/2010 | Sargent | ...................... | C09J 7/00 |
| | | | | 156/152 |
| 2010/0319111 A1 * | 12/2010 | Berns | .................... | A41D 27/24 |
| | | | | 2/440 |
| 2011/0117321 A1 * | 5/2011 | Menon | ................ | B29C 33/3878 |
| | | | | 428/156 |
| 2011/0300339 A1 * | 12/2011 | Ho | .................... | B81C 1/00111 |
| | | | | 428/156 |
| 2012/0295068 A1 * | 11/2012 | Cutkosky | ............ | B29C 33/3857 |
| | | | | 428/167 |
| 2013/0008055 A1 * | 1/2013 | Berns | .................... | A41D 27/24 |
| | | | | 36/103 |
| 2013/0101796 A1 * | 4/2013 | Arzt | ........................ | B82Y 10/00 |
| | | | | 428/156 |
| 2014/0004291 A1 * | 1/2014 | Sitti | .................... | A44B 18/0049 |
| | | | | 428/92 |
| 2014/0010988 A1 * | 1/2014 | Sitti | .................... | A44B 18/0049 |
| | | | | 428/92 |
| 2014/0065347 A1 * | 3/2014 | Sitti | .................... | A44B 18/0049 |
| | | | | 428/92 |
| 2014/0227476 A1 * | 8/2014 | Menon | ................ | B29C 33/3878 |
| | | | | 428/92 |
| 2014/0272272 A1 * | 9/2014 | Spenko | ...................... | C09J 9/00 |
| | | | | 428/113 |
| 2014/0363610 A1 * | 12/2014 | Sameoto | ............... | B81C 99/009 |
| | | | | 428/92 |
| 2015/0238743 A1 | 8/2015 | Che et al. | | |
| 2015/0368519 A1 * | 12/2015 | Sitti | ........................ | C09J 9/00 |
| | | | | 428/399 |
| 2016/0046043 A1 * | 2/2016 | Cutkosky | ............ | B29C 33/3857 |
| | | | | 264/138 |
| 2016/0067893 A1 * | 3/2016 | Poulakis | ............ | A44B 13/0052 |
| | | | | 24/447 |

(56) References Cited

U.S. PATENT DOCUMENTS

2017/0065006 A1* 3/2017 Berns .................... A41D 27/24
2018/0264657 A1 9/2018 Dadkhah Tehrani et al.

FOREIGN PATENT DOCUMENTS

| WO | 2010025515 | A1 | 3/2010 |
|---|---|---|---|
| WO | 2010096072 | A1 | 8/2010 |
| WO | 2010138132 | A1 | 12/2010 |
| WO | 2011063332 | A2 | 5/2011 |
| WO | 2012166053 | A1 | 12/2012 |
| WO | 2014077243 | A1 | 5/2014 |
| WO | 2016094557 | A1 | 6/2016 |
| WO | 2016137555 | A2 | 9/2016 |

OTHER PUBLICATIONS

John Mangels, University of Akron's research into gecko's natural stickiness may pay off in companies and products, The Plain Dealer, Sep. 29, 2012 (Year: 2012).*

Jin et al., Design and Fabrication of Gecko-Inspired Adhesives, Feb. 29, 2012, Langmuir (Year: 2012).*

Boris Luu, Processing PDMS Gecko Tape Using Isopore Filters and Silicon Wafer Templates, Jun. 6, 2011, California Polytechnic State University (Year: 2011).*

International Search Report and Written Opinion for International Application No. PCT/US2015-064795 dated Dec. 29, 2016.

Yue Wang et al: "Fabrication of Well-Defined Mushroom-Shaped Structures for Biomimetic Dry Adhesive by Conventional Photolithography and Molding", ACS Applied Materials and Interfaces, vol. 6., No. 4, Feb. 26, 2014 (Feb. 26, 2014), pp. 2213-2218, XP055253754, US ISSN: 1944-8244, DOI: 10.1021/am4052393.

Hoon Eui Jeong et al: "A Nontransferring Dry Adhesive with Hierarchical Polymer Nanohairs", Proceedings of the National Academy of Sciences of the United States of America, Apr. 7, 2009, pp. 5639-5644, XP055253908, United States, DOI: 10.1073/pnas.0900323106.

International Search Report and Written Opinion for International Application No. PCT/US2015-064791 dated Mar. 17, 2016.

International Search Report and Written Opinion for International Application No. PCT/US2015-064798 dated Jun. 15, 2016.

Office Action from European Application No. 15830916.1 dated Oct. 24, 2019.

* cited by examiner

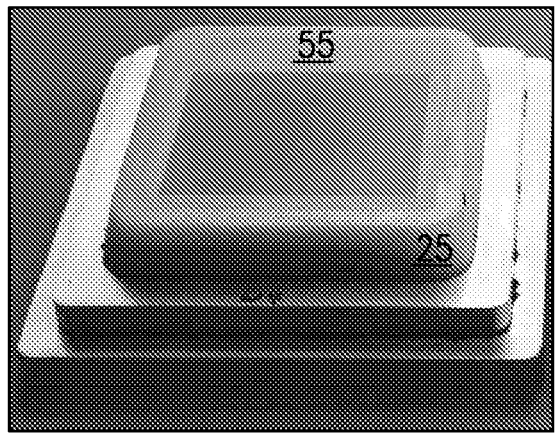
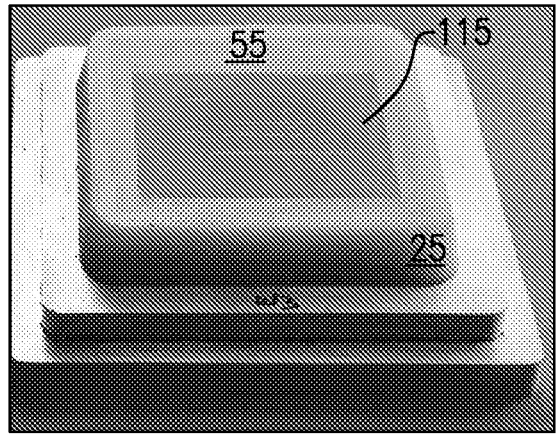
FIG.21A                FIG.21B
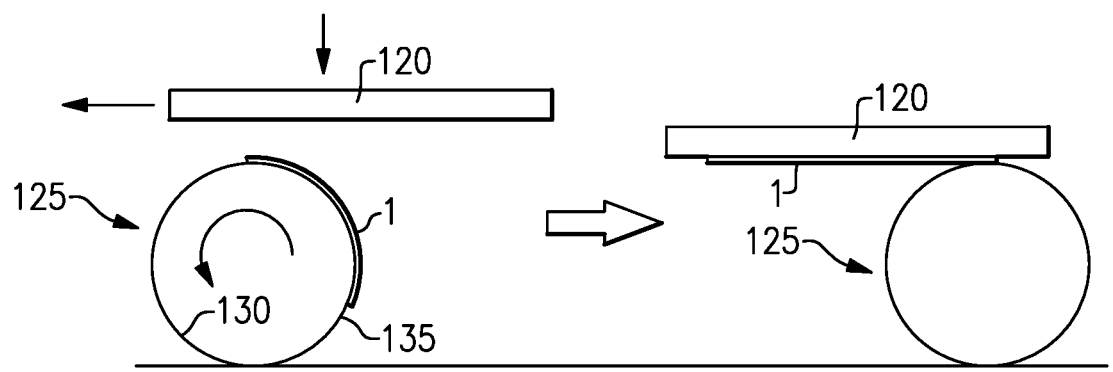
FIG.22A

POLYMER MICROWEDGES AND METHODS OF MANUFACTURING SAME

CROSS-REFERENCE TO RELATED APPLICATION APPLICATIONS

This application is a U.S. National Stage Application under 35 U.S.C. § 371 of International Application No. PCT/US2015/064791 filed Dec. 9, 2015, titled "POLYMER MICROWEDGES AND METHODS OF MANUFACTURING SAME", which claims priority under 35 U.S.C. § 119(e) to U.S. Provisional Application Ser. No. 62/090,337 titled "POLYMER MICROWEDGES AND METHODS OF MANUFACTURING, TESTING AND APPLICATION" filed Dec. 10, 2014, and to U.S. Provisional Application Ser. No. 62/090,265 titled "DURABLE MICRO/NANO MOLD FABRICATION TECHNIQUES" filed Dec. 10, 2014, each of which being incorporated herein by reference in its entirety for all purposes.

This invention was made with government support under N66001-11-C-4101 awarded by the Defense Advanced Research Projects Agency. The government has certain rights in the invention.

FIELD OF INVENTION

Aspects and embodiments disclosed herein are generally directed to synthetic dry adhesive microstructures and methods and apparatus for making same.

BACKGROUND

The gecko is known for its ability to climb smooth vertical walls and even to suspend itself inverted from smooth surfaces. This ability is derived from the presence of elastic hairs called setae that split into nanoscale structures called spatulae on the feet and toes of geckos. The abundance and proximity to the surface of these spatulae make it sufficient for van der Waals forces alone to provide the required adhesive strength for a gecko to climb smooth vertical walls. Researchers have been inspired to create synthetic structures, sometimes referred to as "gecko adhesive," that mimic the natural adhesive properties of gecko feet.

SUMMARY

In accordance with a first aspect, there is provided a mold for casting a micro-scale structure including an embedded fabric. The mold comprises an upper surface including a first cavity having a first depth, a first negative pattern for an array of micro-scale structures defined in a surface of the first cavity, and a fabric retaining frame disposed in the first cavity.

In some embodiments, the mold further comprises at least one second cavity having a second depth defined in the cavity outside of the first negative pattern for the array of micro-scale structures, the at least one second cavity defining a second negative pattern for a standoff of the micro-scale structure. In some embodiments, the negative pattern for the array of micro-scale structures extends into the mold to a greater depth than the second depth.

In some embodiments, the mold is least partially coated with a release agent to reduce adhesion between the mold and a casting material for the micro-scale structure.

In some embodiments, the mold includes a wax portion in which the first cavity is defined. The wax portion may comprise machining wax. The mold may further comprise a base plate and a retainer having a tapered surface corresponding to a taper of side walls of the wax portion and configured to secure the wax portion to the base plate.

In some embodiments, the mold is formed from epoxy.

In some embodiments, the array of micro-scale structures includes an array of microwedges. The microwedges in the array of microwedges may include center lines disposed at an angle of between about 30 degrees and about 70 degrees relative to a plane defined by bases of the microwedges. The microwedges in the array of microwedges may include leading edges disposed and at an angle of between about 20 degrees and about 65 degrees relative to the plane defined by the bases of the microwedges. The microwedges in the array of microwedges may include trailing edges disposed at an angle of between about 35 degrees and about 85 degrees relative to the plane defined by the bases of the microwedges.

In some embodiments, the microwedges include re-entrant spaces defined between leading edges of microwedges and trailing edges of adjacent microwedges.

In some embodiments, the microwedges have heights of between about 80 μm and about 120 μm and bases with widths of between about 20 μm and about 40 μm across. The microwedges in the array of microwedges may have lengths of between about 120 μm and about 160 μm.

In accordance with another aspect, there is provided a method of casting a micro-scale structure in a mold. The method comprises providing a mold including a negative pattern for the micro-scale structure in a first cavity in an upper surface of the mold, depositing a casting material on the negative pattern, disposing a fabric mesh in the casting material in the first cavity, and curing the casting material.

In some embodiments, providing the mold further comprises providing the mold with standoff cavities disposed in the first cavity outside of the negative pattern for the micro-scale structure.

In some embodiments, disposing the fabric mesh in the casting material includes disposing a frame holding the fabric mesh in the first cavity.

In some embodiments, the method further comprises securing a portion of the mold to a base plate with a retainer contacting side walls of the portion of the mold and having a tapered surface corresponding to a taper of the side walls.

In some embodiments, the method further comprises defining the negative pattern for the micro-scale structure by a process including applying a friction reducing agent to the first cavity, machining a micro-scale pattern in the first cavity, and washing the friction reducing agent from the first cavity.

In some embodiments, the method further comprises at least partially coating the upper surface with a release agent.

In some embodiments, the method further comprises applying pressure to the casting material during curing of the casting material.

In some embodiments, the method further comprises pressing the fabric mesh into the casting material.

In some embodiments, the method further comprises removing the micro-scale structure from the mold after the casting material has cured and inspecting the mold after removing the micro-scale structure. The method may further include reconditioning the mold responsive to determining that the mold has become damaged.

In some embodiments, the micro-scale structure includes a plurality of micro-scale elements and one or more standoffs.

In some embodiments, the method further comprises forming smoothness enhancing structures on upper edges of the plurality of micro-scale elements. Forming the smoothness enhancing structures on the upper edges of the plurality of micro-scale elements may comprise depositing a layer of a liquid polymer on an upper surface of an inking plate, placing the micro-scale structure on the inking plate in contact with the liquid polymer, and removing the micro-scale structure from the inking plate. The method may further comprise placing the one or more standoffs in contact the upper surface of the inking plate. The method may further comprise treating the upper edges of the plurality of micro-scale elements with a plasma prior to placing the micro-scale structure on the inking plate. The method may further comprise filtering the liquid polymer prior to depositing the layer of the liquid polymer on the upper surface of the inking plate. The method may further comprise placing the micro-scale structure including the liquid polymer disposed on the upper edges of the plurality of micro-scale elements on a mesa plate, and curing the liquid polymer while the upper edges of the plurality of micro-scale elements are in contact with the mesa plate.

In some embodiments, the method further comprises removing the micro-scale structure from the mold after the casting material has cured and coupling the micro-scale structure to an object.

In some embodiments, the object is an article of clothing and the method comprises coupling the micro-scale structure to the article of clothing with a mechanical fastener.

In some embodiments, the method comprises sewing the micro-scale structure to the article of clothing.

In some embodiments, the object is a glove.

In some embodiments, the object is an article of clothing and coupling the micro-scale structure to the glove includes adhering the micro-scale structure to the glove with an adhesive.

In some embodiments, the object is an article of clothing and coupling the micro-scale structure to the glove includes welding the micro-scale structure to the glove.

In some embodiments, the object is a glove and coupling the micro-scale structure to the glove includes coupling a plurality of the micro-scale structures to the glove, at least one of the plurality of micro-scale structures including micro-elements disposed at an orientation different from an orientation of micro-elements of a second of the plurality of micro-scale structures.

In some embodiments, the method further comprises removing the micro-scale structure from the mold after the casting material has cured and forming the micro-scale structure into an article of clothing.

In some embodiments, the article of clothing is a glove.

In some embodiments, the fabric mesh is a portion of an article of clothing.

In some embodiments, the fabric mesh is a portion of a glove.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 21A illustrates an embodiment of a wax mold for casting a micro-scale dry adhesive structure;

FIG. 21B illustrates an embodiment of a damaged wax mold;

FIG. 22A illustrates an embodiment of a method for depositing a micro-scale dry adhesive structure onto a rigid plate with a roller;

DETAILED DESCRIPTION

Figure 1A:
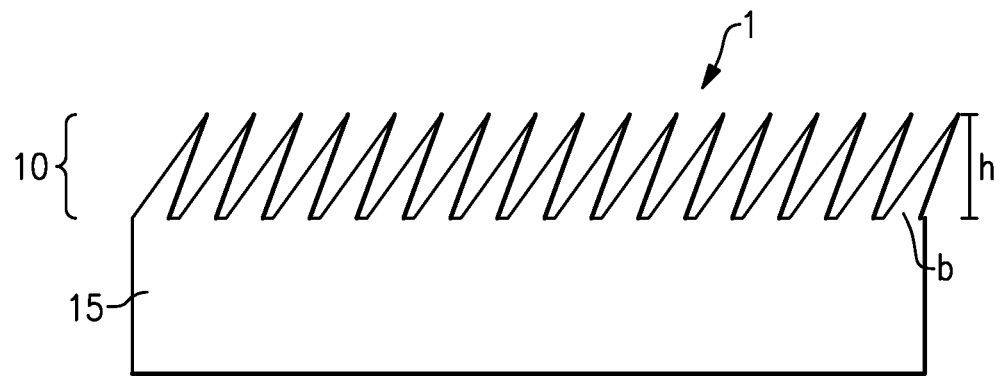
FIG. 1A is an elevational view of a portion of an embodiment of a micro-scale dry adhesive structure including a pattern of microelements.

Aspects and embodiments disclosed herein are not limited in application to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Micro-Scale Dry Adhesive Structures

Aspects and embodiments disclosed herein are generally directed to the formation of novel synthetic "dry adhesive" structures (the term dry adhesive comprising both adhesive and/or friction enhancing structures) and methods and apparatus for making same. Adhesive and/or friction enhancing structures disclosed herein may include micro-scale elements, for example, elements having characteristic dimensions of less than about 100 µm, and are thus referred to herein as micro-scale dry adhesive structures. An example of an embodiment of a micro-scale dry adhesive structure including a pattern of micro-elements is illustrated in FIG. 1A. The micro-scale dry adhesive structure 1 includes a plurality of micro-elements, microwedges 10, disposed on a backing 15. The microwedges 10 may have heights h of about between about 80 µm and about 120 µm and bases b with widths of between about 20 µm and about 40 µm, and length of between about 120 µm and about 160 µm. As illustrated in FIG. 1A, the microwedges may include leading edges 10*l* angled at an angle Γ of between about 20 degrees and about 65 degrees from a line or plane p defined by an upper surface 15s of the backing 15b or the bases of the microwedges. The microwedges may include trailing edges 10t angled at an angle α of between about 35 degrees and about 85 degrees from line or plane p. The microwedges may include centerlines 1 that bisect the microwedges and that are angled at an angle β of between about 30 degrees and about 70 degrees from line or plane p.

The microwedges 10 may have asymmetric tapers about their center lines 1. Tips t of the microwedges 10 may extend over the leading edges 10*l* of adjacent microwedges 10 and adjacent microwedges may define re-entrant spaces 10r defined below a trailing edge 10t of a first microwedge and above a leading edge 10*l* of a second microwedge 10 adjacent the first microwedge 10. These dimensions and angular ranges are examples, and aspects and embodiments disclosed herein are not limited to microwedge structures having these particular dimensions or angles.

Embodiments of the micro-scale dry adhesive structures disclosed herein may be formed from a polymer, for example, polydimethylsiloxane (PDMS), another silicone, polyurethane, or another polymeric material. Specific examples of polyurethanes that embodiments of the adhesive structures disclosed herein may be formed include M-3160 A/B polyurethane and L-3560 A/B polyurethane, available from BJB Enterprises. In some embodiments, the material from which embodiments of the micro-scale dry adhesive structures disclosed herein may be formed exhibit a Shore A hardness of between about 40 and about 60.

Figure 2A:
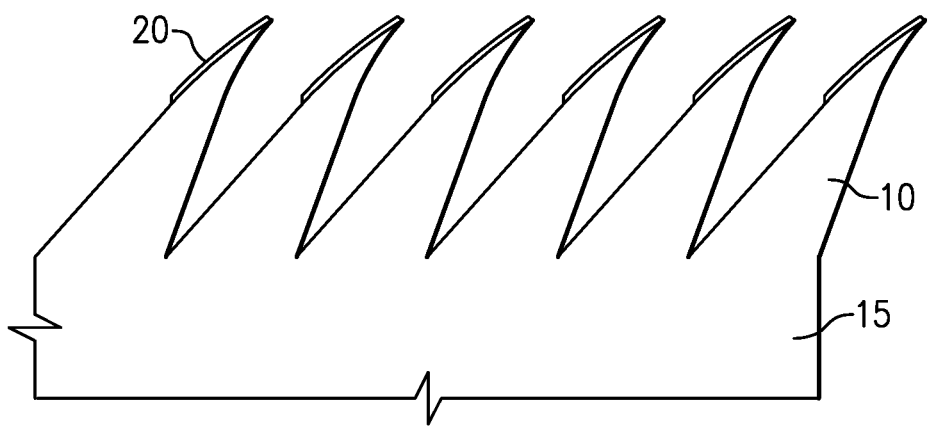
FIG. 2A is a close-up elevational view of an embodiment of microelements that may be used in the micro-scale dry adhesive structure of FIG. 1A.
Figure 2B:
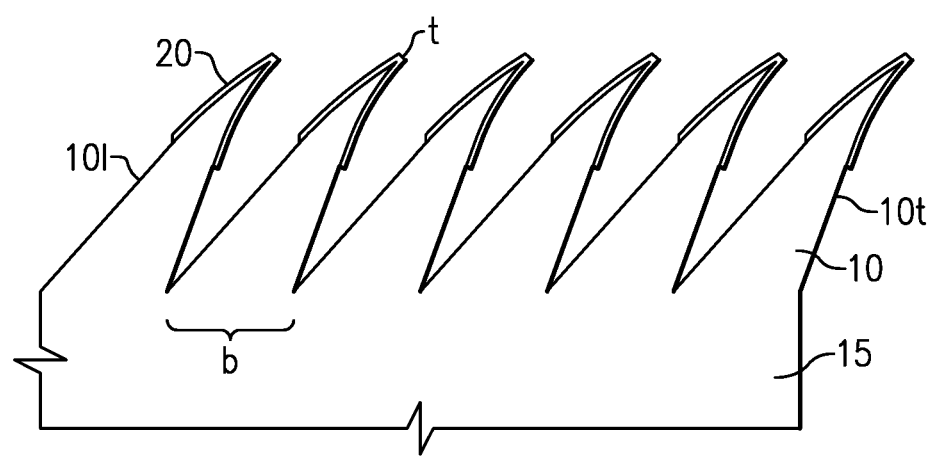
FIG. 2B is a close-up elevational view of another embodiment of microelements that may be used in the micro-scale dry adhesive structure of FIG. 1A.
Figure 3:
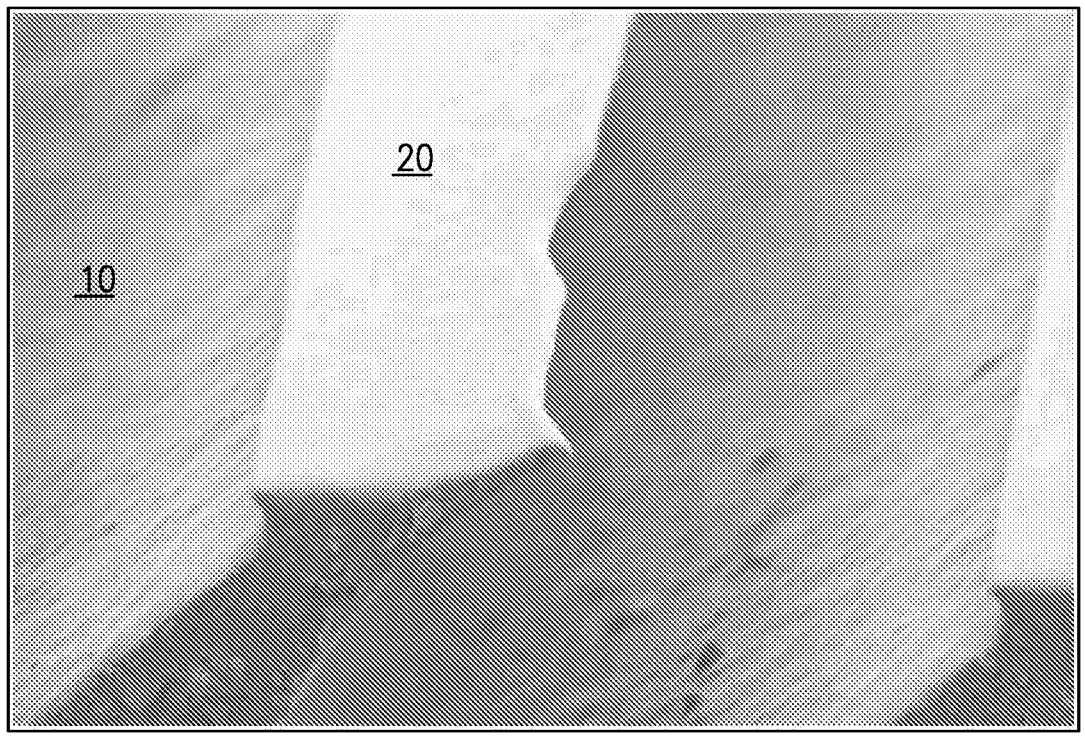
FIG. 3 illustrates a lip formed on an end of a micro-wedge of an embodiment of a micro-scale dry adhesive structure.

In some embodiments, the microwedges 10 of the micro-scale dry adhesive structure 1 may include an extra layer of cured material on the tips of the microwedges forming an adhesion and/or friction enhancing layer 20 (hereinafter "enhancement layer 20"), as illustrated in FIG. 2A, FIG. 2B and in the micrograph of FIG. 3. In some embodiments, the enhancement layers 20 have smoother surfaces than the microwedges 10 and may be added to the microwedges to increase the smoothness of portions of the microwedges proximate tips t of the microwedges 10. The enhancement layers 20 may be formed of an elastomeric material. The enhancement layers 20 may be formed from the same material as the remainder of the microwedges 10, but in some embodiments, may be formed of a different material that that of the remainder of the microwedges 10. The enhancement layers 20 may have smooth surfaces, as illustrated in FIG. 2A, FIG. 2B, and FIG. 3, but in other embodiments, may be patterned, for example, with ridges, columns, or other patterns. In some embodiments, the enhancement layers 20 may be present on only portions of a leading edges 10*l* of the microwedges 10, or in other embodiments may be present on both trailing edges 10*t* and leading edges 10*l* of the microwedges 10. (FIG. 2B.) The enhancement layers 20 may terminate at lips at the intersection of the enhancement layers 20 and the microwedges 10, for example, at the step illustrated in FIG. 3 at the bottom of enhancement layer 20 as it transitions to microwedge 10.

In some embodiments, the bases b of individual microwedges 10 may be spaced from one another, as illustrated in FIG. 1A, for example, by between about 0 μm and about 30 μm, and in other embodiments, for example, as illustrated in FIG. 2B, the leading edge 10*l* of a first microwedge may intersect a trailing edge 10*t* of a second microwedge 10 adjacent to the first microwedge 10 at bases b of the microwedges 10.

In some embodiments, the micro-scale dry adhesive structure may be mounted on a rigid base substrate, for example, a substrate including layers of carbon fibers and plywood, to provide the micro-scale dry adhesive structure with enhanced mechanical stiffness and/or to maintain the microwedges 10 in a substantially same plane.

Figure 1B:
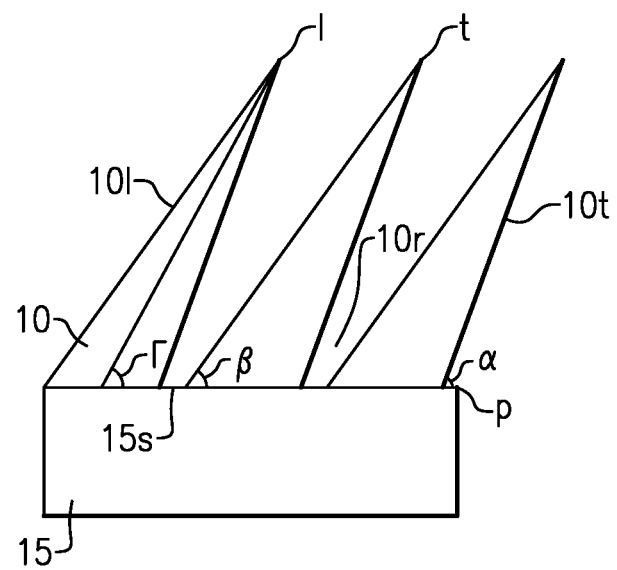
FIG. 1B is a close-up elevational view of an embodiment of microwedges that may be used in the micro-scale dry adhesive structure of FIG. 1A.

In some embodiments, micro-scale dry adhesive structures as illustrated in FIGS. 1-3 may be formed by a micromachining process, for example, by cutting material from a surface of a support or other substrate to form the microwedges. Due to the large number of microwedges that may be included in some embodiments of micro-scale dry adhesive structures (from thousands to millions), serial micromachining processes may be too slow to be practical for the production of large numbers of micro-scale dry adhesive structures. In other embodiments, micro-scale dry adhesive structures as illustrated in FIGS. 1-3 may be formed using microlithography and etching techniques as known in the semiconductor industry. Such microlithography and etching techniques, however, are often complex and costly and may have difficulty fabricating microwedge arrays with re-entrant profiles as desired in some implementations. Accordingly, processes that involve forming micro-scale dry adhesive structures by molding have been developed.

Wax Molds for Micro-Scale Dry Adhesive Structures

In some embodiments, wax molds may be utilized for the production of micro-scale dry adhesive structures. In such embodiments, a wax mold base is formed into a desired size and shape, for example, by casting in a metallic, e.g., aluminum, mold, and a negative micro-element pattern is formed in the upper surface of the wax mold using, for example, a microtome blade or other micromachining tool. A material from which a micro-scale dry adhesive structure is desired to be formed, for example, a PDMS, silicone, or urethane material, is applied to the mold and allowed to cure. After curing, the cured material is removed from the mold with a positive micro-element pattern formed on the surface of the material that was in contact with the mold.

Figure 4A:
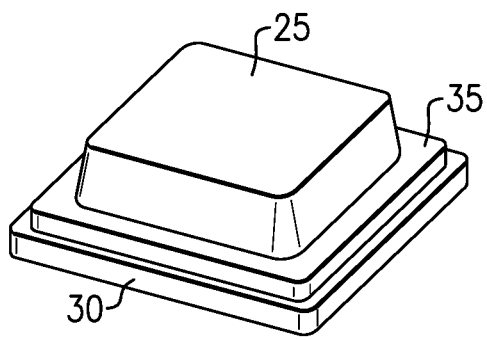
FIG. 4A is an isometric view of an embodiment of a mold for casting a micro-scale dry adhesive structure mounted to a supporting structure.
Figure 4B:
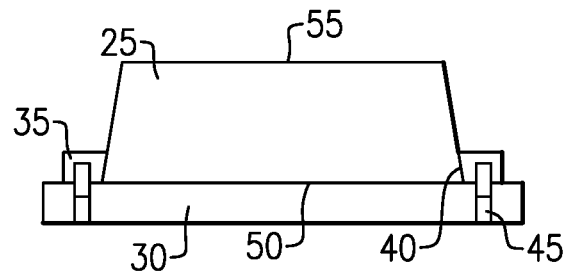
FIG. 4B is a cross sectional view of the mold of FIG. 4A.

An example of a wax mold and supporting structure for casting micro-scale dry adhesive structures is illustrated in FIGS. 4A and 4B. The wax mold includes a wax section 25 formed as a frustum, for example, a truncated pyramid with a trapezoidal cross section. The wax section of the wax mold 25 may be formed from machinists wax or another material suitable for a particular implementation. Machinists wax, also known as machining wax or machinable wax, is a hard wax with a high melt point that has been formulated to deliver exceptional machining properties with high resolution detail. In some embodiments, epoxies or polyurethanes can be poured directly onto the surface of a mold formed from machinable wax without the need for sealers or release agents to provide for the epoxies or polyurethanes to release from the wax mold upon curing. Some formulations of machinable wax may have a hardness rating ranging from about Shore D 45 to about Shore D 58. In some embodiments, machinable wax is formulated from paraffin, polyethylene, and optionally, one or more additional components with relative amounts of the various components adjusted depending on desired properties, for example, hardness of the machinable wax. In other embodiments, the wax section 25 may be formed in the shape of a truncated cone or any other shape having one or more tapered sidewalls.

The wax mold further includes a base plate 30 to which wax section 25 is secured with a window frame shaped retainer 35. The retainer 35 has a tapered surface 40 with a taper corresponding to the taper of sides of the wax section 25 of the wax mold. The retainer 35 is secured to the base plate with one or more fasteners 45, for example, bolts, screws, or other fasteners known in the art. The retainer 35 interfaces with side walls of the wax section 25 of the wax mold to secure the wax section 25 of the wax mold to the base plate 30 for machining and casting of micro-scale dry adhesive structures.

In some embodiments, the wax section 25 is deposited in liquid form directly onto the base plate 30 and surrounded by a mold having a similar shape as retainer 35, but having a height extending to the level of the upper surface 55 of the wax section 25 and allowed to cool and harden. The mold is then removed and retainer 35 attached to the base plate 30 to hold the wax section 25 in place on the base plate.

In other embodiments, the wax section 25 may be formed in a mold not in contact with the base plate 30 and the lower surface 50 of the wax section 25 of the wax mold may be smoothed or planarized prior to mounting on the base plate 30 to minimize or eliminate gaps between lower surface 50 and the base plate 30 that might provide for the wax section 25 of the wax mold to deform as a pattern is cut into the upper surface 55 of the wax section 25 of the wax mold and/or during casting of a micro-scale dry adhesive structure on the wax section 25 of the wax mold. Additionally or alternatively, a layer of liquid wax may be provided on the lower surface 50 of wax section 25 of the wax mold and/or on the base plate 30 as the wax section 25 of the wax mold is being mounted to the base plate 30 to fill in any gaps or surface roughness on the lower surface 50 of the wax section 25 of the wax mold.

Once the wax section 25 of the wax mold is secured to the base plate 30, a negative micro-element array pattern, for example, a pattern for an array of microwedges may be formed on the top surface 55 using a microtome or other micromachining tool. A friction reducing or lubricating agent, for example, a mixture of detergent and water (e.g., a mixture of Ajax® liquid dish soap, available from Colgate-Palmolive and water) may be applied to the top surface 55 of the wax section 25 of the wax mold during formation of the micro-element array pattern to aid in insertion of the microtome or other micromachining tool into the wax section 25 of the wax mold and/or removal of the microtome or other micromachining tool from the wax section 25 of the wax mold. The friction reducing or lubricating agent reduces friction between a micromachining tool used to machine the wax section 25 and reduces surface roughness of machined features as compared to features machined without the use of the friction reducing or lubricating agent.

Figure 5A:
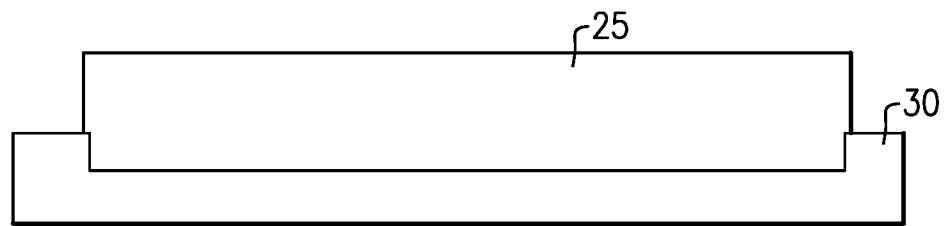
FIG. 5A illustrates a structure formed in a portion of a method of forming an embodiment of a mold for casting a micro-scale dry adhesive structure.
Figure 5B:
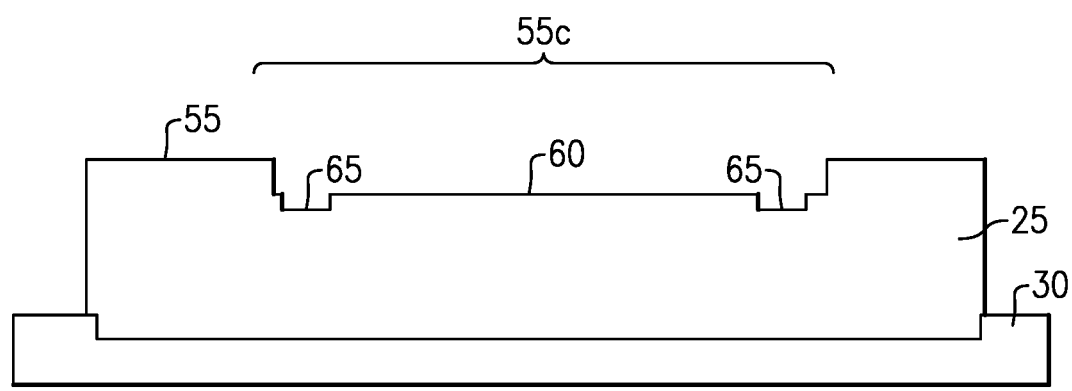
FIG. 5B illustrates a structure formed in a portion of a method of forming an embodiment of a mold for casting a micro-scale dry adhesive structure.
Figure 5C:
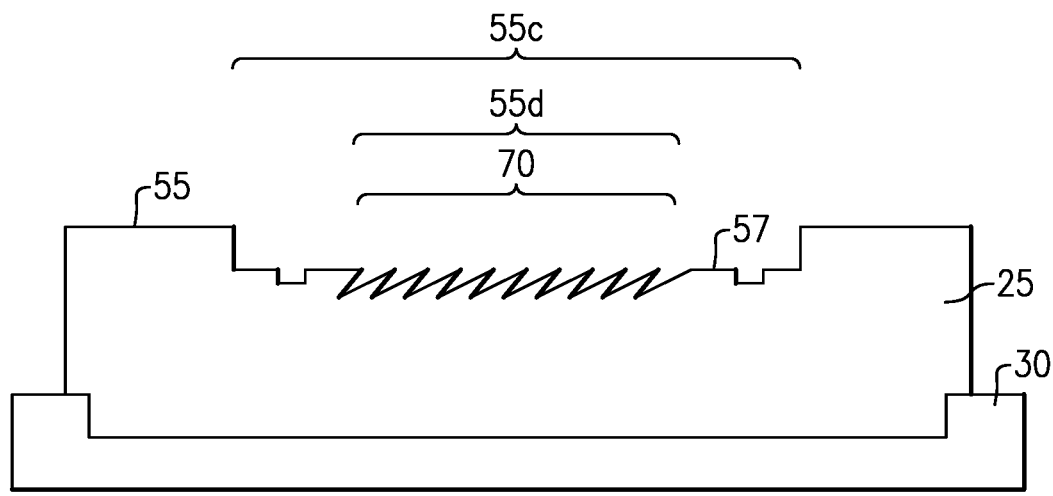
FIG. 5C illustrates a structure formed in a portion of a method of forming an embodiment of a mold for casting a micro-scale dry adhesive structure.

In some embodiments, the micro-element array pattern is machined in the wax section 25 of the wax mold along with features that provide for standoffs to be formed in micro-scale dry adhesive structures formed on the wax mold. An example of this is illustrated in FIGS. 5A-5C. FIGS. 5A-5C and 6A and 6B illustrate a mold with a wax section 25 having substantially vertical sides, however, it should be appreciated that a mold with a wax section 25 with tapered sides, such as that illustrated in FIGS. 4A and 4B may alternatively be used. In FIG. 5A, the unmachined wax section 25 of the wax mold is illustrated disposed on a base plate 30 or frame. In a first machining act, a generally centralized region 55c of the top surface 55 of the wax section 25 of the wax mold is machined to include a first recess 60 to accommodate the backing 15 of the micro-scale dry adhesive structures to be formed from the wax mold and one or more deeper recesses 65 to form standoffs on the microwedge adhesive structures to be formed from the wax mold. Patterns 70 for the micro-elements (e.g., microwedges) are then formed in a second centralized region 55d (within the first centralized region 55c) of the top surface 55 of the wax mold. The patterns 70 extend more deeply into the wax section 25 of the wax mold than the recesses 65. The patterns 70 may be negative microwedge patterns having the same or similar dimensions and angles as the positive microwedges 10 discussed above with reference to FIG. 1B.

Figure 6A:
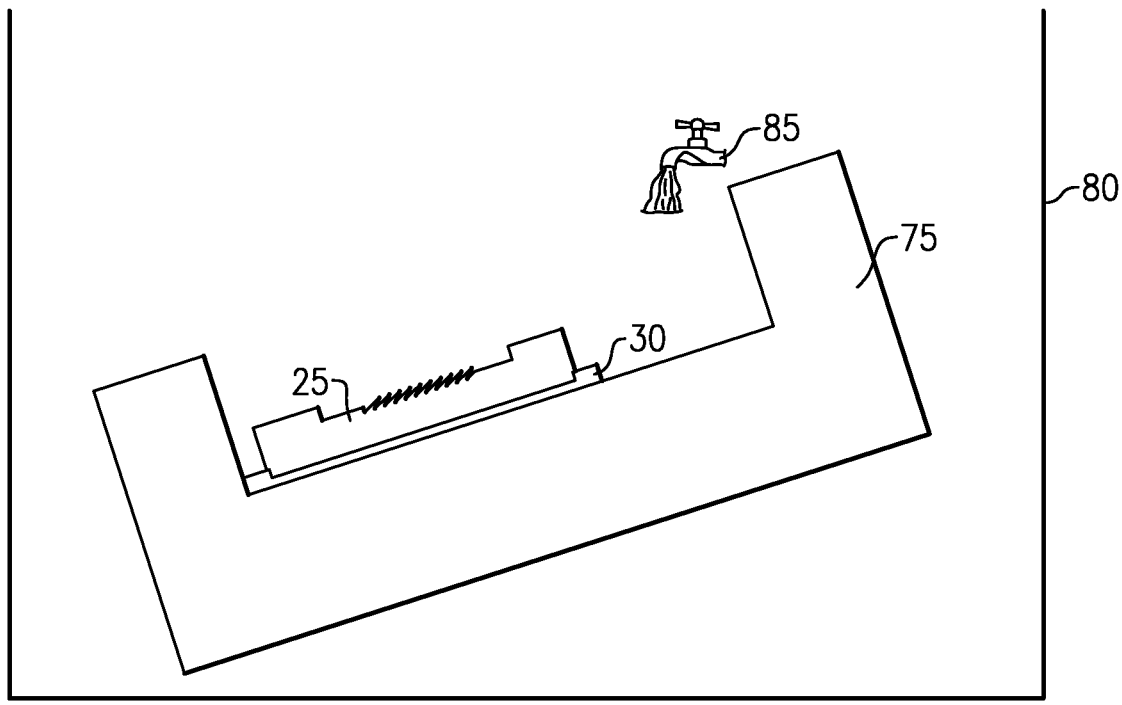
FIG. 6A illustrates an act of cleaning an embodiment of a mold for casting a micro-scale dry adhesive structure.
Figure 6B:
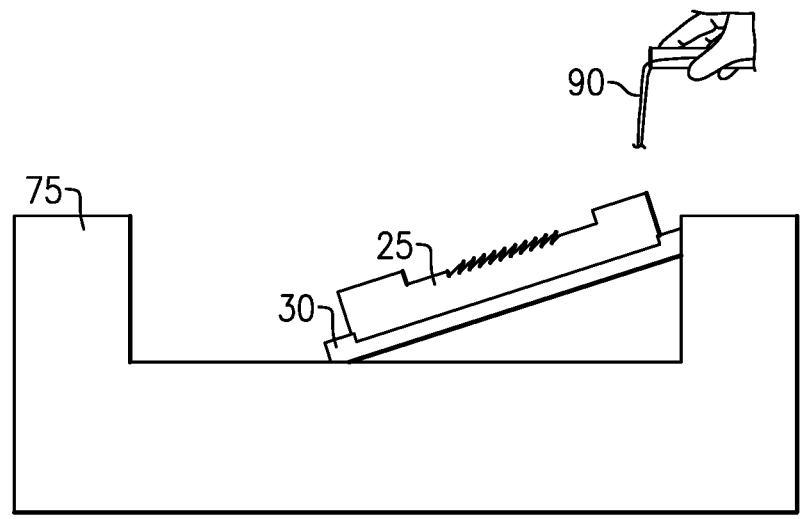
FIG. 6B illustrates another act of cleaning an embodiment of a mold for casting a micro-scale dry adhesive structure.

After formation of the micro-element array pattern 70 on the top surface 55 of the wax section 25 of the wax mold, the wax mold may be cleaned to remove residual surfactant. In one embodiment of a mold cleaning operation, as shown in FIG. 6A, the base plate 30 including the machined wax section 25 of the wax mold is placed in a wash tub 75 in a sink 80 at an angle. Deionized (DI) water 85 which could be at room temperature or could be heated below the melting point of the wax is flowed into the wash tub 75 to rinse the wax mold. The DI water 85 overflows out of the wash tub 75 into the sink 80 during the rinse of the wax mold. The wax mold is rinsed with the DI water for about 20 minutes or until it is verified that the water runoff is clear with no surfactant bubbles. Once the rinse is complete, the wax mold is removed from the water bath and the water is drained from the wash tub 75 and sink 80. The wax mold is then returned to the wash tub 75. The wax mold should be placed so that it is perched on one end so it is almost standing up, as opposed to laying flat down inside the tub 75. As shown in FIG. 5B, isopropanol 90, for example, about 500 mL of isopropanol is flushed across the wax mold. The wax mold is blown dry with low pressure $N_2$, keeping $N_2$ directed at an angle across the wax surface (along the micro-element or microwedge direction).

After machining and/or washing of the wax mold, the machined upper surface 55 of the wax mold may be coated with a release agent 57 (illustrated in FIG. 5C) that will facilitate release of cured micro-scale dry adhesive structures from the wax mold. The release agent may be, for example, REPEL-SILANE™ (a 2% solution of dimethyldichlorosilane dissolved in octamethylcyclooctasilane, available from multiple vendors) release agent, or another release agent known in the art.

Polymer/Epoxy Molds for Micro-Scale Dry Adhesive Structures

In some implementations, it may be desirable to provide molds for microwedge adhesive structures that are more durable than molds formed from wax as described above. The use of durable molds for casting micro-scale dry adhesive structures may facilitate higher volume manufacturing than the use of wax molds due to a higher number of micro-scale dry adhesive structures that may be cast from a durable mold as compared to a wax mold prior to the mold beginning to show signs of deterioration and require reconditioning or replacement. Accordingly, some aspects disclosed herein include durable molds for micro-scale dry adhesive structure casting that are formed of materials stronger than machinists wax and methods of formation of same.

In some embodiments, molds for the casting of micro-scale dry adhesive structures as described herein may comprise or consist of a hard polymer, for example, an epoxy. In one particular embodiment, molds for the casting of micro-scale dry adhesive structures may comprise or consist of CONATHANE® epoxy and/or CONAPDXY® epoxy, low-shrinkage epoxies available from, for example, Cytec, Inc.

Figure 7A:
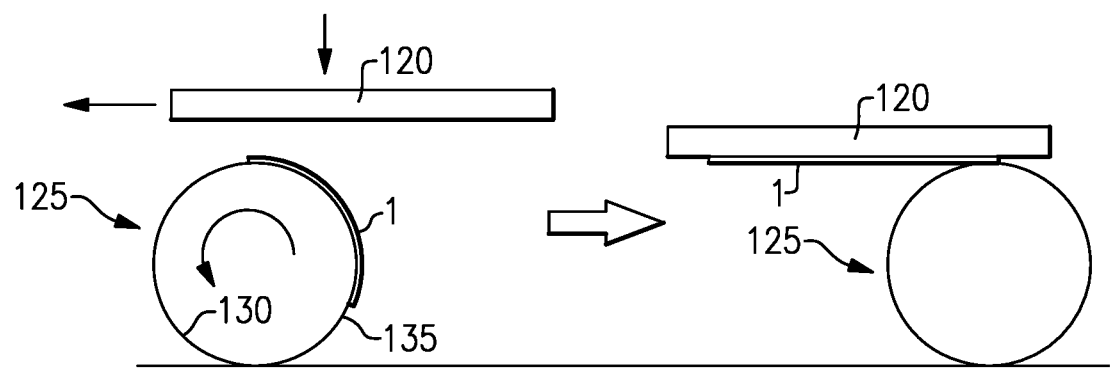
FIG. 7A illustrates an embodiment of a method for depositing a micro-scale dry adhesive structure onto a rigid plate with a roller.
Figure 7B:
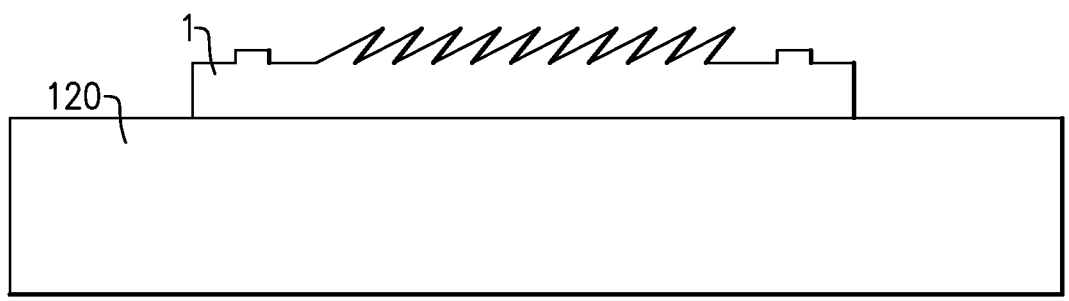
FIG. 7B illustrates the micro-scale dry adhesive structure disposed on the rigid plate of FIG. 7A.

To form an epoxy mold for micro-scale dry adhesive structure casting, a known good micro-scale dry adhesive structure 1, for example, a micro-scale dry adhesive structure 1 formed in a wax mold as described above, is adhered to a rigid plate 120, for example a glass plate or other form of rigid flat plate. As illustrated in FIGS. 7A and 7B, a roller 125 including a rigid tube 130 covered with a compliant layer 135, for example, neoprene may be used to apply the micro-scale dry adhesive structure 1 to the rigid plate 120, squeezing the micro-scale dry adhesive structure 1 as it is applied to the rigid plate 120 to minimize the formation of air bubbles between the micro-scale dry adhesive structure 1 and the rigid plate 120. The micro-scale dry adhesive structure 1 may adhere to the rigid plate 120 by static electrical attraction, van der Waals forces, or by use of a temporary adhesive, for example, REVALPHA™ thermal release tape.

Figure 8:
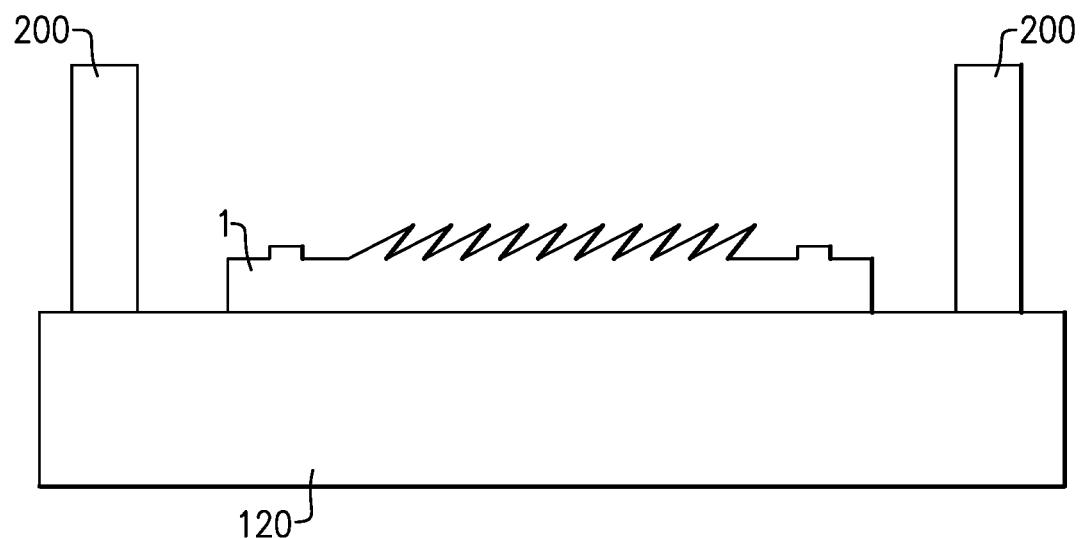
FIG. 8 illustrates a micro-scale dry adhesive structure disposed on a rigid plate of with a dam formed about the micro-scale dry adhesive structure.
Figure 9:
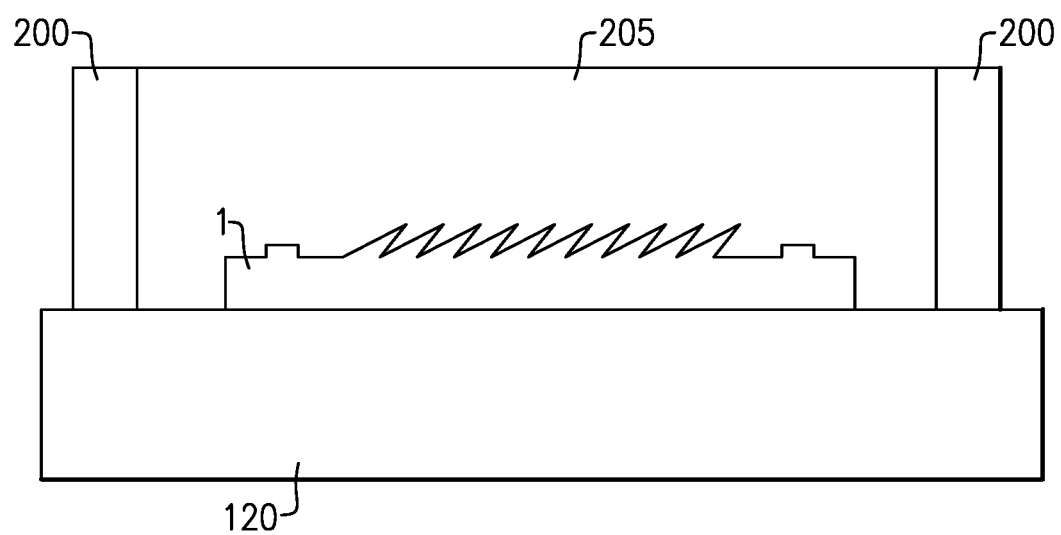
FIG. 9 illustrates the structure of FIG. 8 with a liquid polymer or epoxy deposited on the micro-scale dry adhesive structure and rigid plate in an area defined by the dam.

After the known good micro-scale dry adhesive structure 1 is adhered to a rigid plate 120, a dam 200 of material, for example, silicone or PDMS, is formed about the micro-scale dry adhesive structure 1 on the rigid plate 120 (FIG. 8). Optionally, REVALPHA™ thermal release tape or another release agent is disposed on the upper surface of the rigid plate 120 prior to forming or adhering the dam 200 to the rigid plate 120 to aid in removal of the dam 200 and/or epoxy mold from the rigid plate 120 after forming the epoxy mold. In some embodiments, the back surface (the surface not including the micro-element pattern) of the known good micro-scale dry adhesive structure 1 is cleaned, for example, in an $O_2$ plasma prior to being adhered to the rigid plate 120. Optionally, a release layer, for example, REPEL-SILANE™ or vapor deposited trichlorosilane may be deposited on the surface of the rigid plate 120 and the micro-scale dry adhesive structure 1 within the boundaries of the dam 200. A mold material, for example, a polymer or epoxy 205 (e.g., CONATHANE® epoxy and/or CONAPDXY® epoxy) is then poured onto the surface of the rigid plate 120 and the micro-scale dry adhesive structure 1 within the boundaries of the dam 200 (and over the optional release layer, if used) (FIG. 9). In some embodiments, the polymer or epoxy 205 is degassed in a vacuum before and/or after pouring onto the surface of the rigid plate 120 and the micro-scale dry adhesive structure 1 within the boundaries of the dam 200 to facilitate a reduction or elimination of air bubbles in the polymer or epoxy 205. Additionally or alternatively, pressure may be applied to the polymer or epoxy 205, for example, by placing the structure illustrated in FIG. 9 in a high pressure environment, during curing of the polymer or epoxy 205 to facilitate a reduction or elimination of air bubbles in the cured polymer or epoxy 205.

Figure 10:
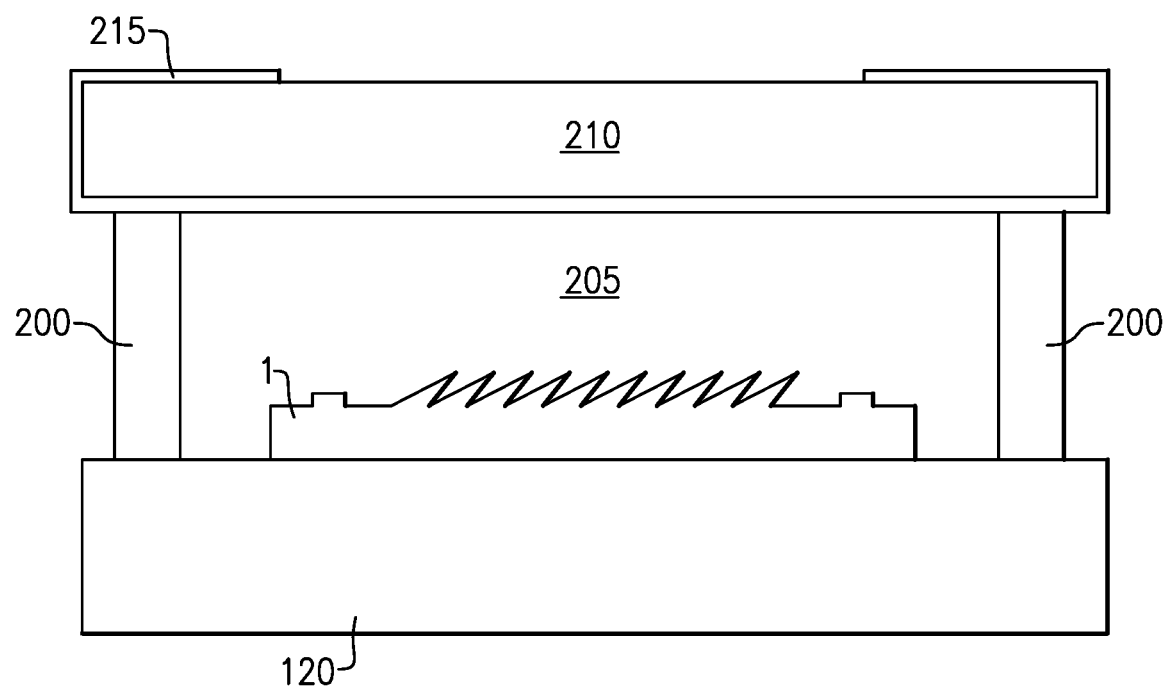
FIG. 10 illustrates an embodiment of a rigid plate wrapped in a plastic wrap disposed on the surface of the liquid polymer or epoxy illustrated in FIG. 9.
Figure 11:
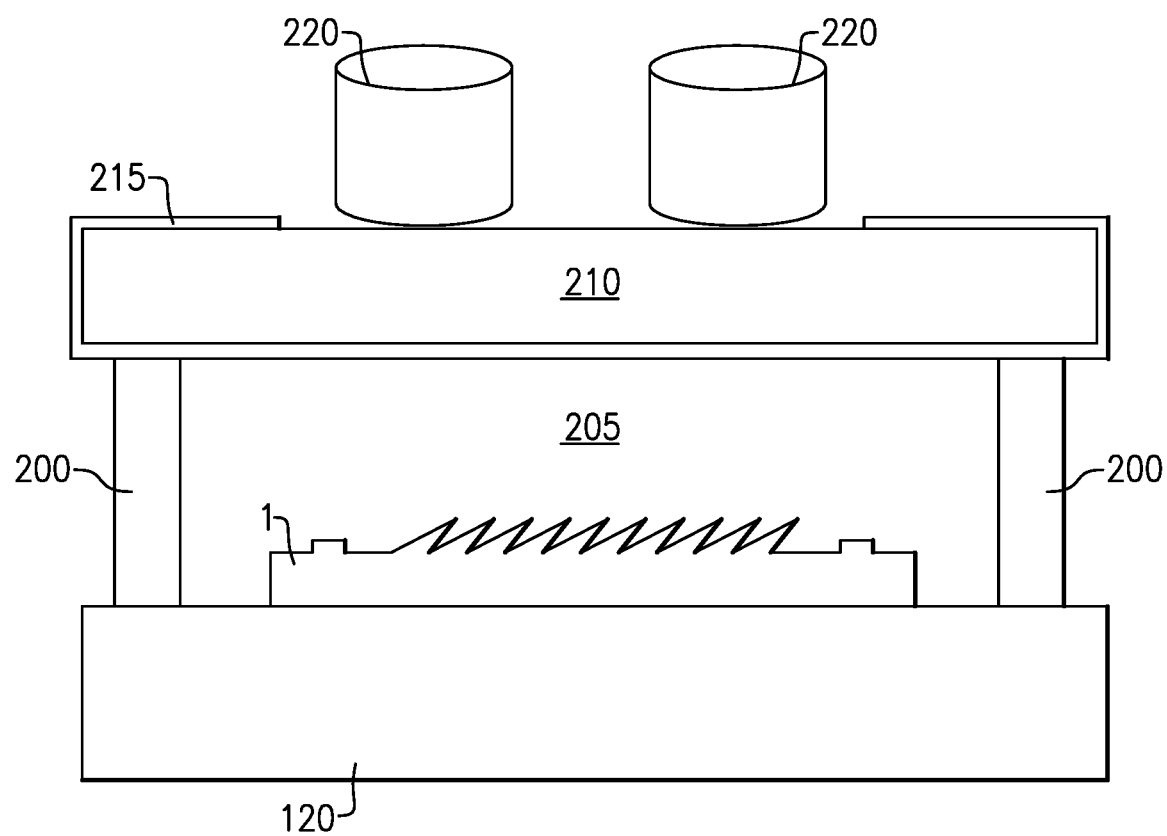
FIG. 11 illustrates weights disposed on the rigid plate of FIG. 10.

In some embodiments, as illustrated in FIG. 10, a rigid plate 210, for example a glass plate or other flat surface, optionally wrapped in a release layer 215 is placed on top of the poured polymer or epoxy 205. The release layer 215 is selected to adhere less strongly to the polymer or epoxy 205, when cured, than the rigid plate 210 would adhere to the cured polymer or epoxy 205. In other embodiments, the release layer 215 is selected to not adhere to the rigid plate 210 and to be flexible when not adhered to the rigid plate 210 so that it may be more easily peeled from the cured polymer or epoxy 205 than the rigid plate 205 may be removed from the cured polymer or epoxy 205. The release layer 215 may comprise or consist of, for example, a polymer sheet (e.g., a sheet of polyvinyl chloride (PVC) or low density polyethylene (LDPE)), Saran™ plastic wrap, or aluminum foil. In some embodiments, the rigid plate 210 is cleaned, for example, with isopropanol, a plasma clean (e.g., in a $CF_4/O_2$ plasma), or a wet clean (e.g., in a $H_2O_2/H_2SO_4$ solution), prior to being wrapped in the release layer 215. In embodiments in which the rigid plate 210 is transparent or translucent, the rigid plate 210 may be pushed down on until the dam 200 is visible through the rigid plate 210. In some embodiments, a roller or other device is utilized to eliminate any air bubbles between the release layer 215 and the rigid plate 210 prior to placing the rigid plate 210 on the poured polymer or epoxy 205. A weight, for example, a pair of five pound weights 220, is placed on top of the rigid plate 210 (FIG. 11). The weights 220 may apply pressure to the poured polymer or epoxy 205 to aid in reducing or eliminating the formation of air bubbles in the poured polymer or epoxy 205 during curing. The polymer or epoxy 205 is left to cure. In some embodiments, heat may be applied to the polymer or epoxy 205 to accelerate curing, for example by placing the structure shown in FIG. 11 in an oven at about 80° C. for about 16 hours, or for a time and temperature suitable for the material and dimensions of the polymer or epoxy 205 layer. In other embodiments, the polymer or epoxy 205 is left to cure at room temperature. In some embodiments, the structure shown in FIG. 11 is placed in a pressure chamber at a pressure of, for example, between about 30 psi and 50 psi, while the polymer or epoxy 205 cures to aid in reducing or eliminating the formation of air bubbles in the poured polymer or epoxy 205 during curing.

Figure 12:
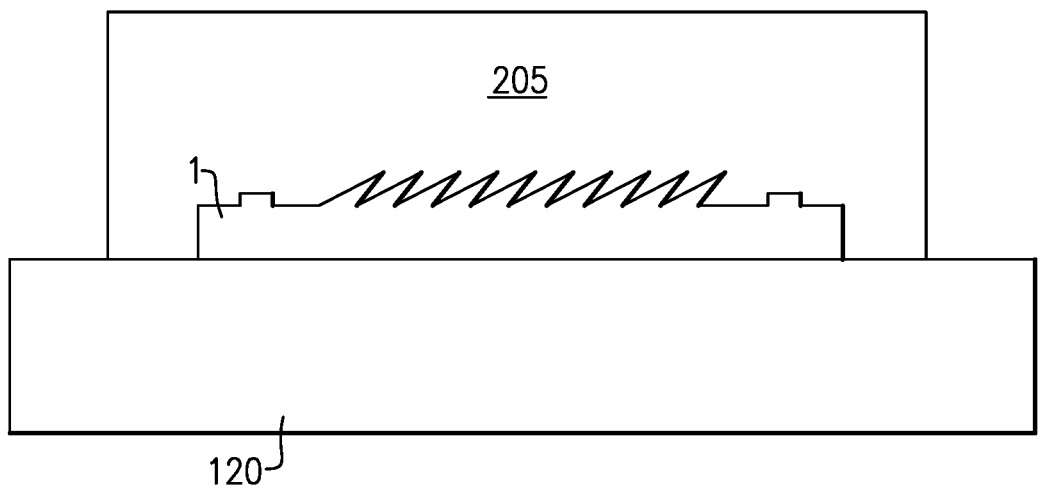
FIG. 12 illustrates the polymer or epoxy deposited on the micro-scale dry adhesive structure and rigid plate after curing and removal of the weights, dam, and rigid plate illustrated in FIG. 11.
Figure 13:
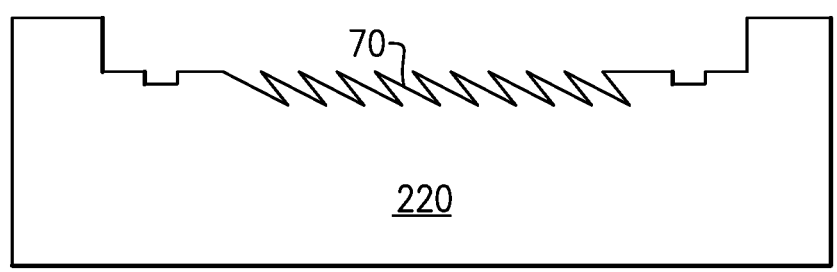
FIG. 13 illustrates the cured polymer or epoxy removed from the micro-scale dry adhesive structure and rigid plate of FIG. 12 to form a mold for casting of micro-scale dry adhesive structures.

After the polymer or epoxy 205 has cured, the weight(s) 220 are removed, the release layer 215 is unwrapped from the rigid plate 210, and the rigid plate 210, the release layer 215, and the dam 200 is removed from the rigid plate 120 (FIG. 12). The rigid plate 120 is removed, for example, by applying sufficient heat to cause a thermal release tape applied between to the rigid plate 120 and the micro-scale dry adhesive structure 1 to release, and the micro-scale dry adhesive structure 1 is peeled out of the cured polymer or epoxy 205 to leave a formed polymer or epoxy mold 220 (FIG. 13). The formed polymer or epoxy mold 220 may include negative microwedge patterns 70 having the same or similar dimensions and angles as the positive microwedges 10 discussed above with reference to FIG. 1B. The polymer or epoxy mold 220 be used to cast micro-scale dry adhesive structures.

Metal Molds for Micro-Scale Dry Adhesive Structures

In accordance with a further aspect a mold for casting micro-scale dry adhesive structures that is more durable than a polymer or epoxy mold may be formed from a metal or metal alloy. In some embodiments, the metal mold may be formed by electroforming, micromachining, or a combination of the two.

Figure 14:
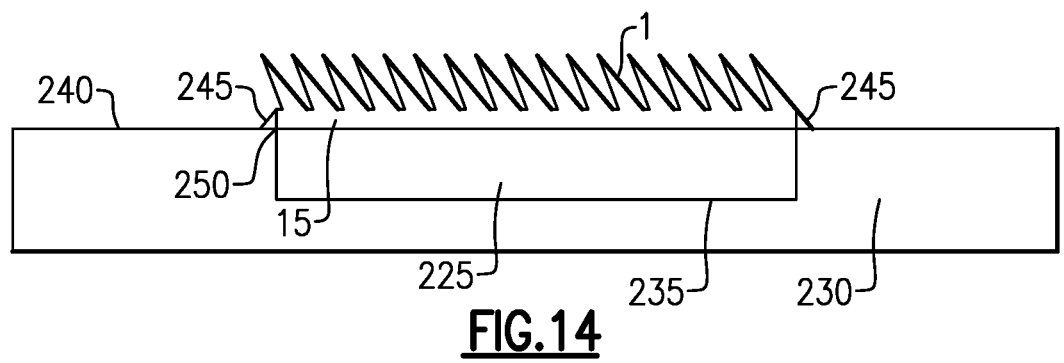
FIG. 14 illustrates an embodiment of a micro-scale dry adhesive structure disposed on a back plate and mounted on a plating fixture.

A process for electroforming a metal mold for casting micro-scale dry adhesive structures is illustrated beginning at FIG. 14. As illustrated in FIG. 14, a known good micro-scale dry adhesive structure 1, for example, a micro-scale dry adhesive structure 1 formed in a wax mold as described in U.S. patent application Ser. No. 13/451,713, and optionally mounted on a backing substrate 225, is secured to and/or in a plating fixture 230. In some embodiments, a cavity 235 is formed in the plating fixture to receive the backing substrate 225.

In other embodiments, where the micro-scale dry adhesive structure 1 is not mounted on a backing substrate 225, the micro-scale dry adhesive structure 1 may be directly adhered to a flat upper surface 240 of the plating fixture 230 using any of a variety of adhesives known in the art, for example, double-stick tapes (e.g., REVALPHA™ thermal release tape, Nitto Denko Corporation) or glues (e.g., Sil-Poxy® silicone rubber adhesive, Smooth-On Inc.). A roller including a rigid tube covered with a compliant layer, for example, neoprene may be used to apply the micro-scale dry adhesive structure 1 to the plating fixture 230, squeezing the micro-scale dry adhesive structure 1 as it is applied to the plating fixture 230 to minimize the formation of air bubbles between the micro-scale dry adhesive structure 1 and the plating fixture 230.

The plating fixture 230 may comprise steel or any other rigid, and optionally, conductive, material. In some embodiments, the backing 15 of the micro-scale dry adhesive structure 1 may extend above the upper surface 240 of the plating fixture 230, for example, by about 0.027 inches (about 0.06 cm) to set a uniform 0.027 inch recess into the finished metal mold to form the backing 15 of additional micro-scale dry adhesive structures 1 from the finished metal mold.

A fillet 245, for example, an epoxy fillet, may be formed at the interface 250 between side walls of the backing 15 of the micro-scale dry adhesive structure 1 and the plating fixture 230. The epoxy fillet 245 is used to fill any gaps that might be present between the micro-scale dry adhesive structure 1 and the cavity 235 of the plating fixture 230 to prevent metal from being electroformed in any such gaps and forming undesired features on an electroformed mold or that may make it difficult to release the completed electroformed mold from the plating fixture 230.

Figure 15:
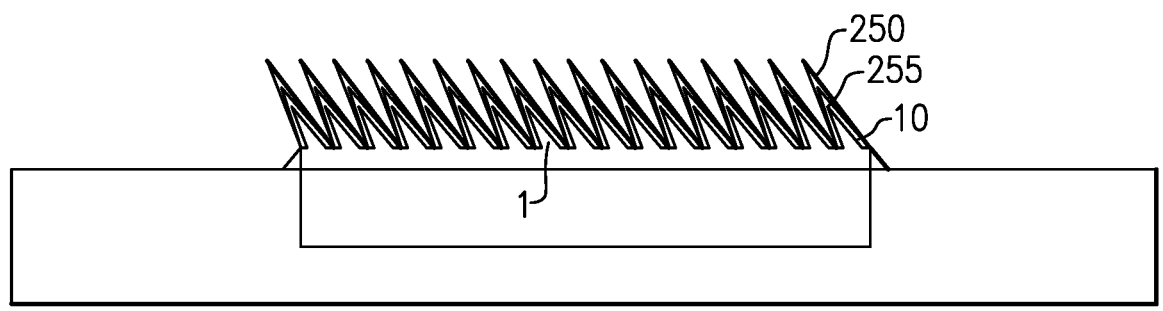
FIG. 15 illustrates the micro-scale dry adhesive structure of FIG. 14 coated with an adhesion layer and a release layer.

As illustrated in FIG. 15, the micro-elements 10 of the micro-scale dry adhesive structure 1 may be coated with a release layer 250 that will aid in releasing a metal mold electroformed on the micro-scale dry adhesive structure 1 from the micro-scale dry adhesive structure 1. In some embodiments, an adhesion layer 255 is first deposited on the micro-scale dry adhesive structure 1 to facilitate adhesion of the release layer 250 to the micro-scale dry adhesive structure 1. In some embodiments, the release layer 250 may include or consist of polytetrafluoroethylene (PTFE) or REPEL-SILANE™ and the adhesion layer 255 may include or consist of chromium and/or titanium. The adhesion layer 255 may be deposited on the micro-scale dry adhesive structure 1 by, for example, sputtering. The release layer 250 may be deposited on the adhesion layer 255 and/or micro-scale dry adhesive structure 1 by, for example, initiated chemical vapor deposition (iCVD) for PTFE, or vapor deposition for REPEL-SILANE™.

Figure 16:
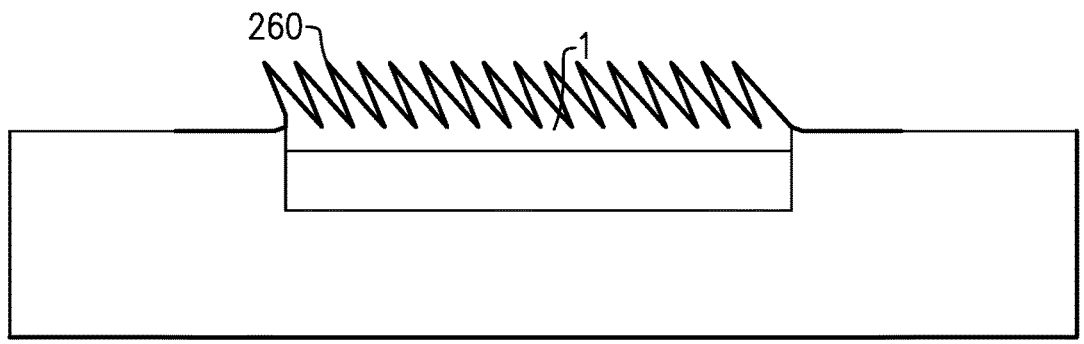
FIG. 16 illustrates the micro-scale dry adhesive structure of FIG. 15 coated with a conductive seed layer.
Figure 17:
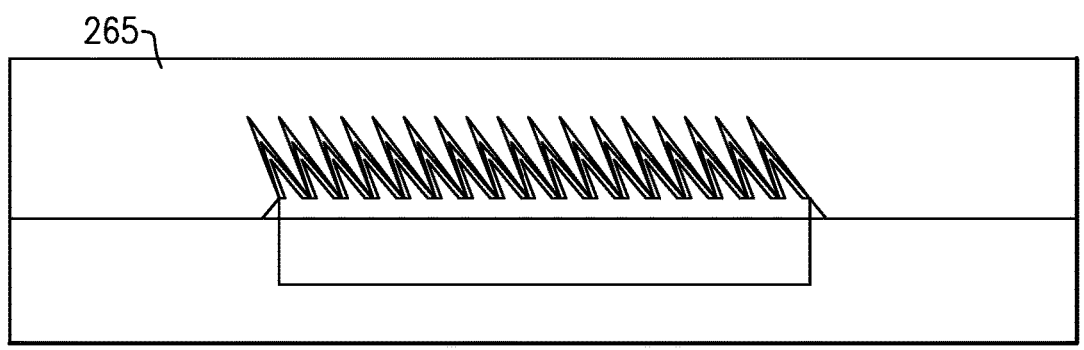
FIG. 17 illustrates a metal structure electrodeposited on the micro-scale dry adhesive structure of FIG. 16.

A seed metal layer 260, for example, a layer of molybdenum or copper, is deposited onto the release layer 250 or micro-scale dry adhesive structure 1 (FIG. 16, release layer 250 and adhesion layer 255 not shown for clarity) and the body 265 of the metal mold is formed on the seed layer 260, for example, by electroplating (FIG. 17, seed layer not visible). The body 265 of the metal mold may be the same metal as that of the seed layer 260 or a different metal, for example, copper, aluminum, steel, or a metal alloy.

Figure 18:
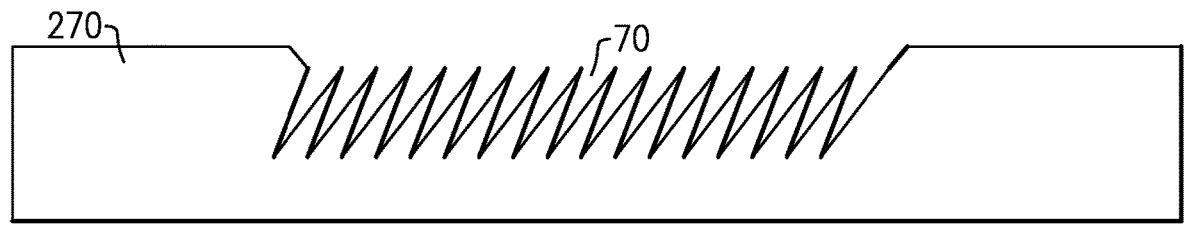
FIG. 18 illustrates the metal structure of FIG. 17 removed from the micro-scale dry adhesive structure and plating fixture to form a mold for casting micro-scale dry adhesive structures.

The metal mold is then removed from the micro-scale dry adhesive structure 1 and plating fixture, resulting in a completed metal mold 270 (FIG. 18). The metal mold 270 may be inspected and in some embodiments, micromachining, for example, with a diamond tool or other micromachining tool to remove defects, to smooth surfaces of the metal mold 270, or to otherwise finish the metal mold 270. In some embodiments, a release agent, for example, PTFE, REPEL-SILANE™, or trichlorosilane may be coated on surfaces of the metal mold 270. The machined metal mold 270 may include negative microwedge patterns 70 having the same or similar dimensions and angles as the positive microwedges 10 discussed above with reference to FIG. 1B.

In other embodiments, the metal mold 270 may be used as an injection mold insert. The metal mold 270 may be placed in an injection molding apparatus in an opposed position to a backing substrate 225. A polymer material may be injected into the space between the metal mold 27 and the backing substrate 225 to form a micro-scale dry adhesive structure mounted on a backing substrate 225 in a single injection molding operation.

Figure 19:
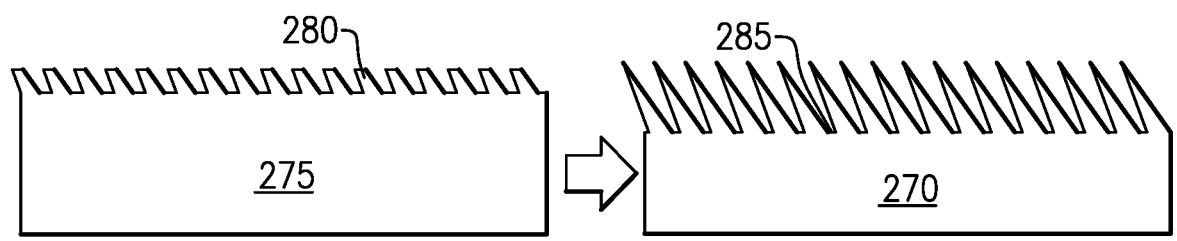
FIG. 19 illustrates an embodiment of a method of machining a mold for casting micro-scale dry adhesive structures.

In other embodiments, a metal mold 270 for casting micro-scale dry adhesive structures may be formed without the use of a pre-fabricated micro-scale dry adhesive structure by directly machining a metal block 275. For example, a metal block 275 may optionally be roughly machined by standard micromachining tools, for example, micro-milling bits made from tool steel or polycrystalline diamond stock (~0.001"-0.010" in diameter), to form an array of wedge stubs 280 with a desired orientation, wedge angle and pitch. In some embodiments, cutouts between adjacent wedges may have dimensions, for example widths, about 10 µm to about 20 µm less than the cutouts that will be used to mold microwedges in a finished mold. A diamond tool or other fine finishing tool (formed from, for example silicon carbide or tool steel) may be used to further process the metal block 275 to form finished microgrooves 285 and complete the metal mold 270 (FIG. 19). Additionally or alternatively, a 3D printer may be utilized to form the array of wedge stubs 280 on the metal block 275. Electroplating may be performed on the 3D printed array of wedge stubs 280 to fill in voids left by the 3D printing operation and/or to smooth the array of wedge stubs 280. A diamond tool or other fine finishing tool may be used to further process the metal block 275 to form finished microgrooves 285 from the 3D printed array of wedge stubs 280 and complete the metal mold 270. Alternatively, the diamond or other fine finishing tool may be used to directly form wedge cutouts in a metal layer without first forming stubs (with the potential for more wear on the tool).

Casting of Micro-Scale Dry Adhesive Structures

Figure 20A:
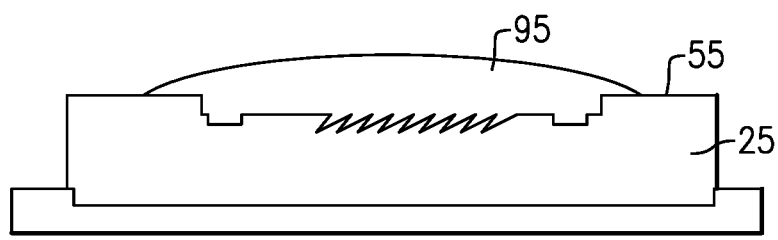
FIG. 20A illustrates a step of depositing a material for forming an embodiment of a micro-scale dry adhesive structure on a mold.

An embodiment of a method for casting a micro-scale dry adhesive structure from a mold, for example, any of a wax mold, a polymer mold, an epoxy mold, or a metal mold as disclosed above, is illustrated in FIGS. 20A-20F. These figures illustrate casting micro-scale dry adhesive structure on a wax portion 25 of a wax mold, but it should be understood that substantially similar acts would be performed when casting a micro-scale dry adhesive structure from a mold formed of a different material, for example, a polymer, epoxy, or metal. FIG. 20A illustrates a casting material 95, for example, a polymer in liquid form, from which a micro-scale dry adhesive structure is to be formed, deposited onto the top surface 55 of a wax portion 25 of a wax mold. In some embodiments, the polymer comprises or consists of PDMS. In other embodiments, the polymer may comprise or consist of a silicone, a urethane or another polymer selected for an intended implementation. It should be understood that in some embodiments in which a wax mold it utilized, the wax mold may configured as illustrated and described with reference to FIGS. 4A and 4B, rather than as shown in FIGS. 20A-20F.

Figure 20B:
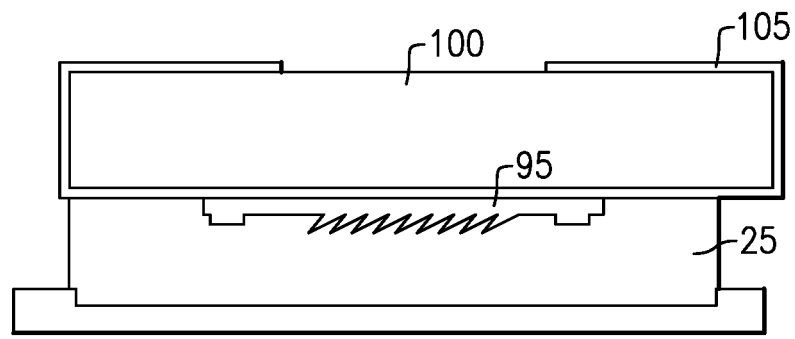
FIG. 20B illustrates a step of placing a compression plate wrapped in a release layer on the material for forming an embodiment of a micro-scale dry adhesive structure in the mold of FIG. 20A.
Figure 20C:
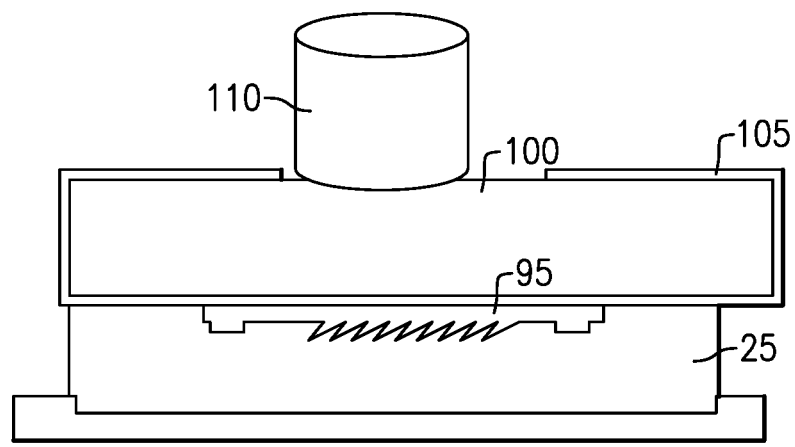
FIG. 20C illustrates a step of placing a weight on the compression plate of FIG. 20B.

As shown in FIG. 20B, a rigid plate 100, for example, a glass plate or other flat surface wrapped in a release layer 105 is placed on top of the poured casting material 95. The release layer 105 is selected to adhere less strongly to the polymer material 95, when cured, than the rigid plate 100 would adhere to the cured polymer material 95. In other embodiments, the release layer 105 is selected to not adhere to the rigid plate 100 and to be flexible when not adhered to the rigid plate 100 so that it may be more easily peeled from the cured casting material 95 than the rigid plate 100 may be removed from the cured casting material 95. The release layer 105 may comprise or consist of, for example, a polymer sheet (e.g., a sheet of polyvinyl chloride (PVC) or low density polyethylene (LDPE)), Saran™ plastic wrap, or aluminum foil. In some embodiments, the rigid plate 100 is cleaned, for example, with isopropanol, a plasma clean (e.g., in a $CF_4/O_2$ plasma), or a wet clean (e.g., in a $H_2O_2/H_2SO_4$ solution), prior to being wrapped in the release layer 105. The rigid plate 100 is pushed down on the wax mold. In implementations where the rigid plate 100 is transparent or translucent, the rigid plate 100 is pushed down on until the wax portion 25 of the wax mold is visible through the rigid plate 100. In some embodiments, a roller or other device is utilized to eliminate any air bubbles between the release layer 105 and the rigid plate 100 prior to placing the rigid plate 100 on the poured casting material 95. A weight 110, for example, a five pound weight, is placed on top of the rigid plate 100 (FIG. 20C). The casting material 95 is left in the mold overnight, or for an appropriate time based on the type of casting material 95 used, to cure. In some embodiments, heat may be applied to the casting material 95 to accelerate curing, but care should be taken not to heat the mold to a point at which it starts to deform or melt. In some embodiments, the casting material 95 may be UV-curable, and UV light may be applied to the casting material, through the rigid plate 100 (if transparent to UV light) to accelerate curing.

Figure 20D:
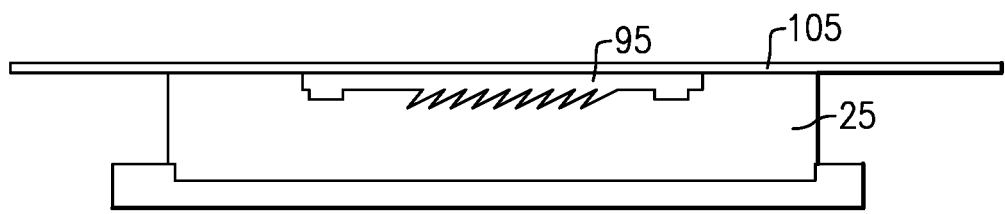
FIG. 20D illustrates a step of removing the compression plate from cured material in the mold of FIG. 20A.
Figure 20E:
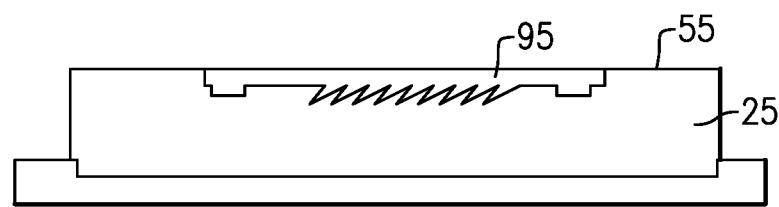
FIG. 20E illustrates a step of removing the release layer from the cured material in the mold of FIG. 20A.
Figure 20F:
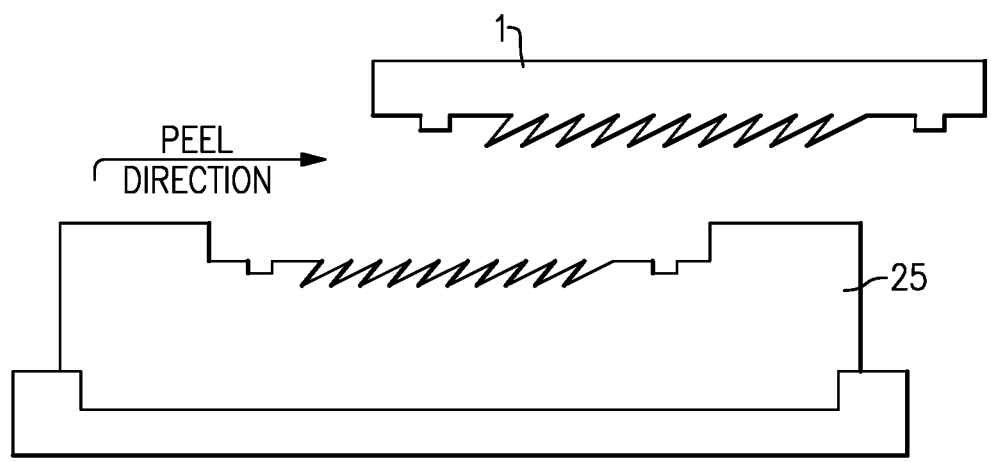
FIG. 20F illustrates removing the cured material from the mold of FIG. 19A to obtain an embodiment of a micro-scale dry adhesive structure.

After the casting material 95 has cured, the weight 110 is removed, the release layer 105 is unwrapped from the rigid plate 100, and the rigid plate 100 is removed from atop the mold. (FIG. 20D.) The release layer 105 is then removed from atop the cured casting material 95 and upper surface 55 of the mold. (FIG. 20E.) The cured casting material 95 may then be removed from the mold by gently peeling the patch of cured casting material 95 from one end from the mold to obtain a free micro-scale dry adhesive structure 1. (FIG. 20F.) In some embodiments in which the micro-elements of the micro-scale dry adhesive structure 1 include microwedges, peeling in the direction of tilt of the microwedge patterns 70 may facilitate reducing the potential for damage to the casting material 95 and/or mold during the act of removing the cured casting material 95 from the mold 95. (See FIG. 20F.) In implementations in which a wax mold is utilized to cast the micro-scale dry adhesive structure 1, sticky tape, for example, Scotch™ adhesive tape may be utilized to remove wax residue from the micro-elements of the micro-scale dry adhesive structure 1.

The above process can be repeated with the same mold until the mold begins to show signs of deterioration. For example, in implementations in which a wax mold is utilized to cast the micro-scale dry adhesive structure 1, deterioration of the mold may be manifested by a noticeable amount of wax being pulled out of the mold when demolding the cured casting material 95. Damage to the wax mold may appear as lines 115 in the upper surface 55 of the wax portion 25 of the wax mold where wax has pulled out as shown in FIG. 21B (as compared to FIG. 21A, showing an undamaged wax mold). When the wax mold has become damaged, the upper surface 55 may be smoothed or ground down and a new molding pattern machined into the upper surface 55 of the wax portion 25 of the wax mold so the reconditioned mold may be reused. In some embodiments, a wax mold may be used to form from about 3 to about 8 micro-scale dry adhesive structures before being reconditioned.

In epoxy, polymer, or metal molds, after demolding a cast micro-scale dry adhesive structure 1 from the mold, the mold may be inspected for the presence of residual material of the micro-scale dry adhesive structure. If residual material of the micro-scale dry adhesive structure is observed to be left behind in the mold, the mold may be cleaned, for example, by removing the residual material with a knife or brush and/or by washing the mold in water, IPA, or another appropriate solvent.

Figure 22B:
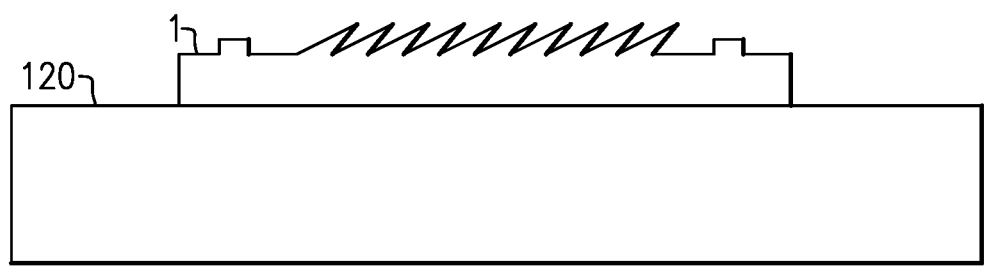
FIG. 22B illustrates the micro-scale dry adhesive structure disposed on the rigid plate of FIG. 22A.

In a process particularly suitable to micro-scale dry adhesive structures including microwedges as micro-elements, a process of inking may be performed to add enhancement layers 20 to the microwedges 10 of the micro-scale dry adhesive structure removed from the mold. In a first act of an inking process, the micro-scale dry adhesive structure 1 is adhered to a rigid plate 120, for example, a glass plate or other form of rigid flat plate. In some embodiments, the back surface (the surface not including the microwedge pattern) of the micro-scale dry adhesive structure 1 is cleaned, for example, in an $O_2$ plasma prior to being adhered to the rigid plate 120. As shown in FIGS. 22A and 22B, a roller 125 including a rigid tube 130 covered with a compliant layer 135, for example, neoprene may be used to apply the micro-scale dry adhesive structure 1 to the rigid plate 120, squeezing the micro-scale dry adhesive structure 1 as it is applied to the rigid plate 120 to minimize the formation of air bubbles between the micro-scale dry adhesive structure 1 and the rigid plate 120. The micro-scale dry adhesive structure 1 may adhere to the rigid plate 120 by static electrical attraction, van der Waals forces, or by use of a temporary adhesive, for example, REVALPHA™ thermal release tape.

Figure 23:
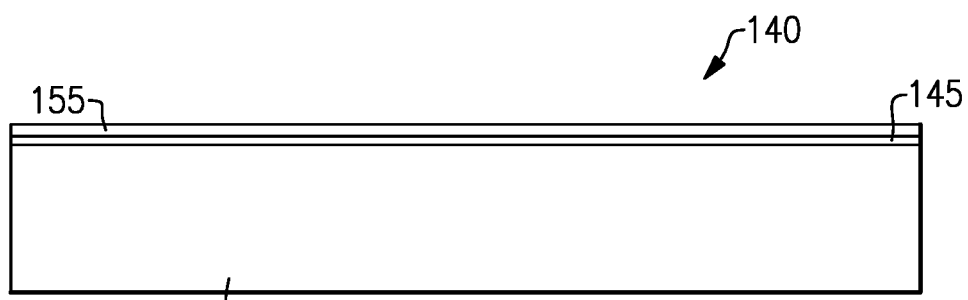
FIG. 23 illustrates an embodiment of an inking plate.

An inking plate 140 is formed by applying an optional layer of REPEL-SILANE™ release agent 145 or another release coating to a plate 150, for example, a silicon wafer, and then applying a layer of liquid polymer 155, for example, PDMS, silicone, urethane, or another polymer onto the layer of release agent 145. (FIG. 23.) In some embodiments the liquid polymer is filtered prior to application onto the layer of release agent 145 to remove particulates from the liquid polymer. The optional layer of release agent 145 may be several monolayers thick (for REPEL-SILANE™) or between about 10 nm to about 100 nm thick for other release coatings. The layer of liquid polymer 155 may be between about 50 nm and about 500 nm thick.

Figure 24:
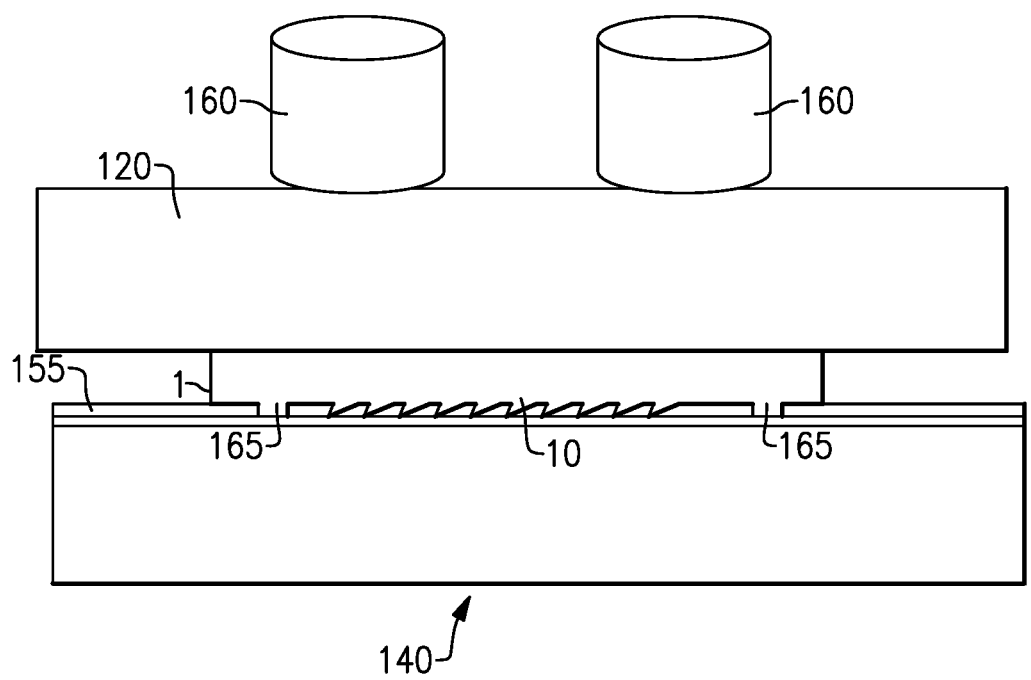
FIG. 24 illustrates the micro-scale dry adhesive structure disposed on the rigid plate of FIG. 22A disposed on the inking plate of FIG. 23.

To form the enhancement layers 20 on the microwedges 10 of the micro-scale dry adhesive structure 1, the microwedge adhesive structure 1 mounted on the rigid plate 120 is placed on the inking plate 140 with the microwedges 10 of the micro-scale dry adhesive structure 1 in contact with the layer of liquid polymer 155. Weights 160, for example, two five pound weights, may be placed on the rigid plate 120 to force the microwedges 10 into the liquid polymer 155 to ink the microwedges with the liquid polymer 155. The standoffs 165 on the micro-scale dry adhesive structure keep the rigid plate 120 and the inking plate 140a set distance from one another and control the length over which the microwedges 10 are contacted with the liquid polymer 155. (FIG. 24.)

Figure 25:
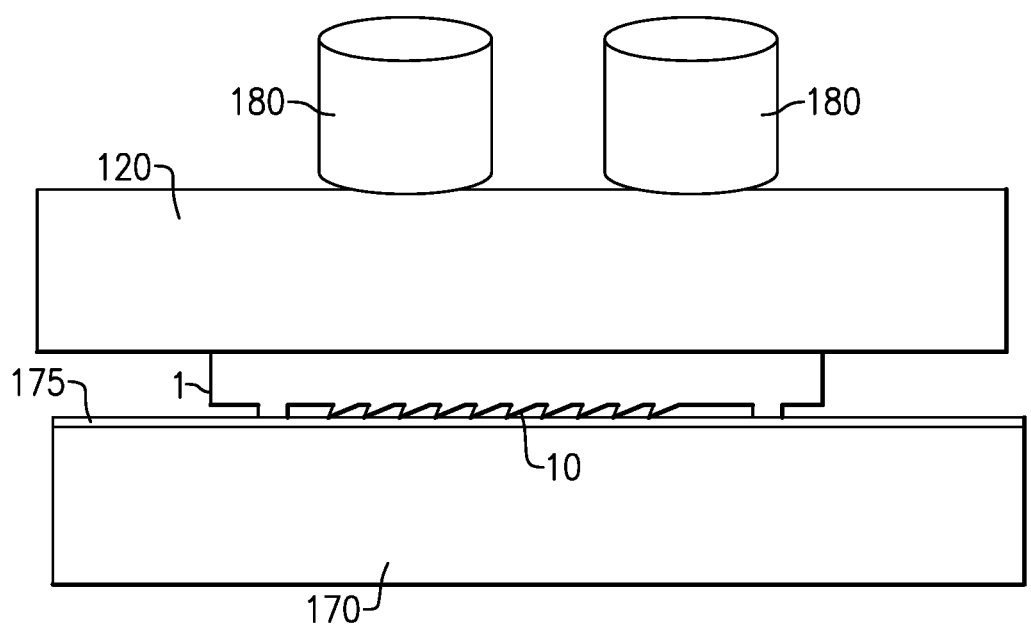
FIG. 25 illustrates the micro-scale dry adhesive structure disposed on the rigid plate of FIG. 21A disposed on an embodiment of a curing plate.

The micro-scale dry adhesive structure may be left in place between the rigid plate 120 and the inking plate 140 until the liquid polymer 155 cures to form the enhancement layers 20 in the tips of the microwedges 10. Alternatively, the adhesive structure 1 may be squeezed by weights 160 between the rigid plate 120 and the inking plate 140 for about one minute to ink the microwedges 10 and then the microwedge adhesive structure 1 mounted on the rigid plate 120 is removed from the inking plate 140 and placed on a cure plate 170, for example, a silicon wafer or other flat surface, optionally coated with a release agent 175, for example, REPEL-SILANE™ release agent, while the liquid polymer 155 inked onto the microwedges cures. Weights 180, for example two five pound weights may be used to press the microwedges against the cure plate 170. (FIG. 25.) In some embodiments, the assembly illustrated in FIG. 25 may be placed in an oven heated to about 100 degrees C. to accelerate curing of the liquid polymer 122, for example, for about one hour. In some embodiments, the liquid polymer 122 may be UV-curable, and UV light may be applied to the liquid polymer 122, through the rigid plate 120 and/or cure plate 170 (if transparent to UV light) to accelerate curing. After the liquid polymer 155 has cured, the micro-scale dry adhesive structure 1 mounted on the rigid plate 120 is separated from the cure plate 170, and the micro-scale dry adhesive structure 1 is removed from rigid plate 120, for example, by peeling or by chemical or photo dissolution of any adhesion layer that was used to adhere the micro-scale dry adhesive structure 1 to the rigid plate 120. In some embodiments, the cure plate 170 has a smooth surface to produce enhancement layers 20 with smooth surfaces, and in other embodiments, the cure plate 170 may be micro or nano-patterned to form a desired pattern in the enhancement layers 20.

Figure 26:
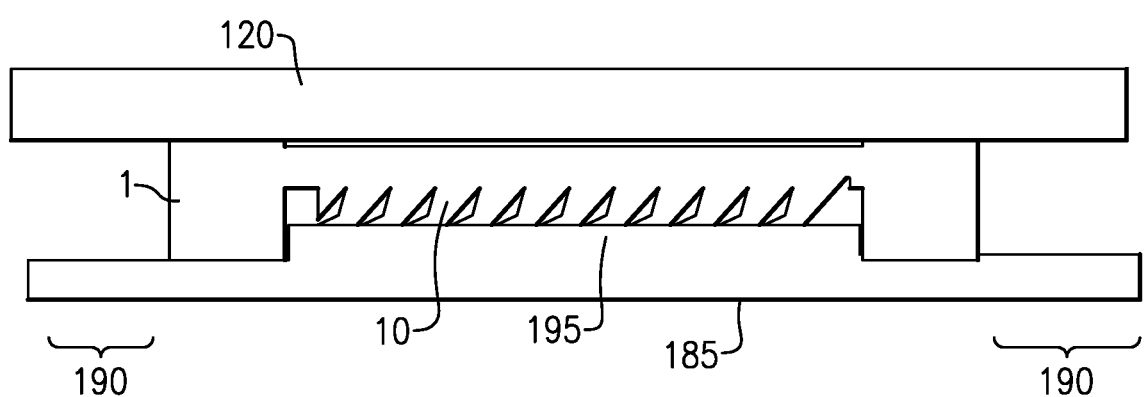
FIG. 26 illustrates the micro-scale dry adhesive structure disposed on the rigid plate of FIG. 22A disposed on an embodiment of a mesa curing plate.

In a variation to the curing process illustrated in FIG. 26, a mesa plate 185, for example, a silicon wafer including thinned edge portions 190 and a mesa 195 may be used in place of the cure plate 170. Use of the mesa plate 185 may provide for curing of the liquid polymer 155 to occur at higher compression of the microwedges 10 than was experienced by the microwedges 10 during the inking process. The height of the mesa 195 on the mesa plate 185 may be tailored to tailor the enhancement layers 20 formed on the edges of the microwedges. In some embodiments, use of a mesa plate 185 may provide for the formation of thinner enhancement layers 20 and/or lips on the microwedges than use of the cure plate 170, for example, by limiting capillary flow of the liquid polymer 155. Without being limited to a particular theory, it is believed that when the inked microwedge tips are brought down to the cure plate 170, there are droplets of liquid polymer 155 on them. If the microwedges 10 are brought down onto the cure plate 170 at same height for curing as was used for inking on the inking plate 140, excess liquid polymer 155 may be drawn by capillary force into a meniscus. If the microwedges 10 are squeezed harder by using the mesa plate 185, then less uncured liquid polymer 155 is left exposed and less of a lip/meniscus is formed since the excess liquid polymer 155 is distributed over the tips of the microwedges 10 by the greater force exerted on the microwedges 10 by the mesa plate 185 as compared to the cure plate 170. In some embodiments, the mesa 195 has a smooth surface to produce enhancement layers 20 with smooth surfaces, and in other embodiments, the mesa 195 may be patterned to form a desired pattern in the enhancement layers 20.

Incorporation of Micro-Scale Dry Adhesive Structures into Gloves and Other Items In accordance with some embodiments, micro-scale dry adhesive structures as disclosed herein may be incorporated into larger scale objects, for example, surfaces of articles of clothing, gripping surfaces of objects, or other surfaces desired to exhibit adhesive properties and/or a high coefficient of friction. To facilitate incorporation of micro-scale dry adhesive structures as disclosed herein into or on to larger scale objects, a fabric or mesh material may be incorporated into the backing 15 of embodiments of micro-scale dry adhesive structures.

Figure 27A:
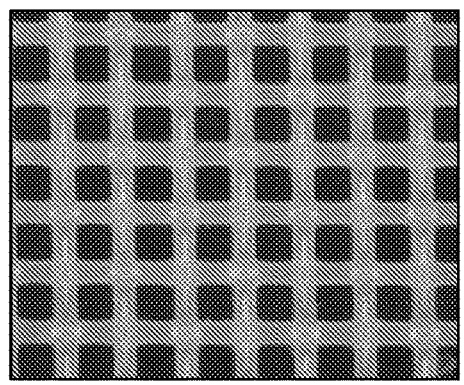
FIG. 27A illustrates an embodiment of a fabric mesh that may be incorporated into embodiments of a micro-scale dry adhesive structure.
Figure 27B:
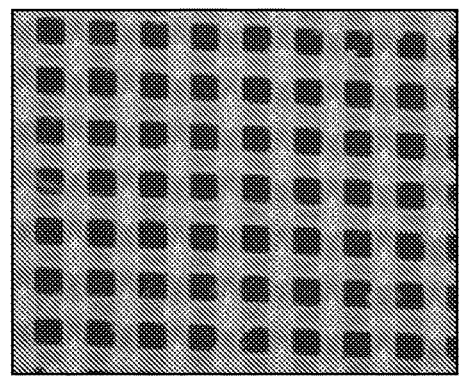
FIG. 27B illustrates another embodiment of a fabric mesh that may be incorporated into embodiments of a micro-scale dry adhesive structure.
Figure 27C:
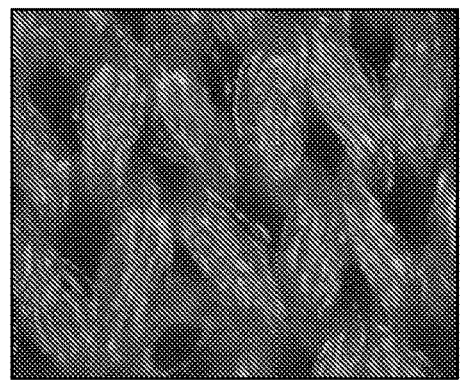
FIG. 27C illustrates another embodiment of a fabric mesh that may be incorporated into embodiments of a micro-scale dry adhesive structure.

FIGS. 27A, 27B, and 27C illustrate examples of fabric mesh materials that may be incorporated into the backing 15 of micro-scale dry adhesive structures as disclosed herein. FIG. 27A is a micrograph of a mesh of L-3560 polyurethane (BJB Enterprises) having a thread diameter of 86 µm and openings 150 µm across. FIG. 27B is a micrograph of a mesh of L-3560 polyurethane (BJB Enterprises) having a thread diameter of 76 µm and openings 100 µm across. FIG. 27C is a micrograph of a fabric mesh of a typical polyester shirt. In other embodiments, polyester or nylon meshes with mesh sizes ranging from about 50 to about 400 may be utilized for incorporation into the backing 15 of micro-scale dry adhesive structures as disclosed herein. Cotton, silk, or other natural or synthetic fibers and/or fiber meshes may also or alternatively be used in various embodiments.

Figure 28A:
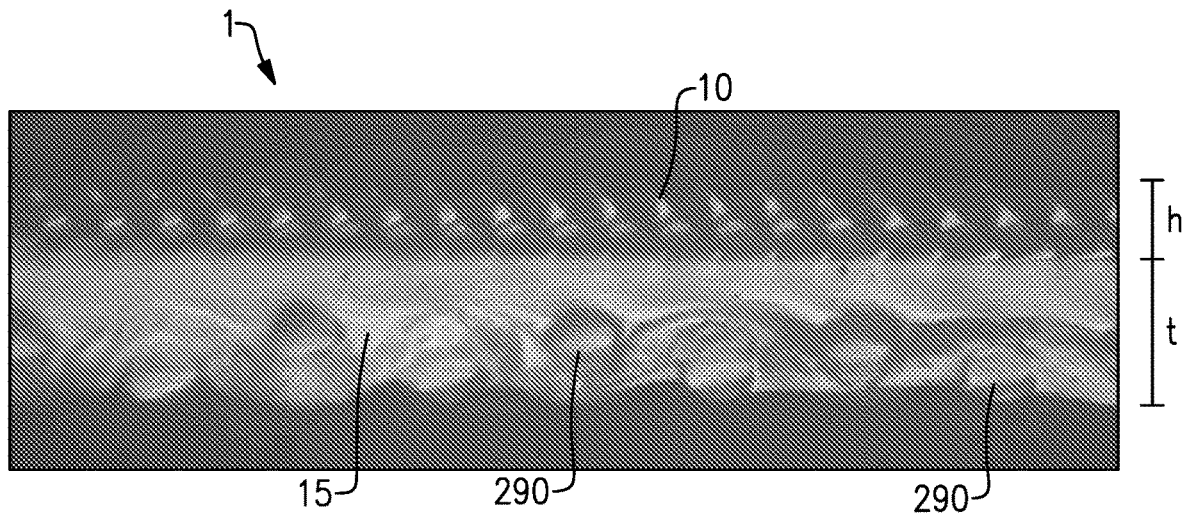
FIG. 28A illustrates an embodiment of a micro-scale dry adhesive structure incorporating a fabric mesh.
Figure 28B:
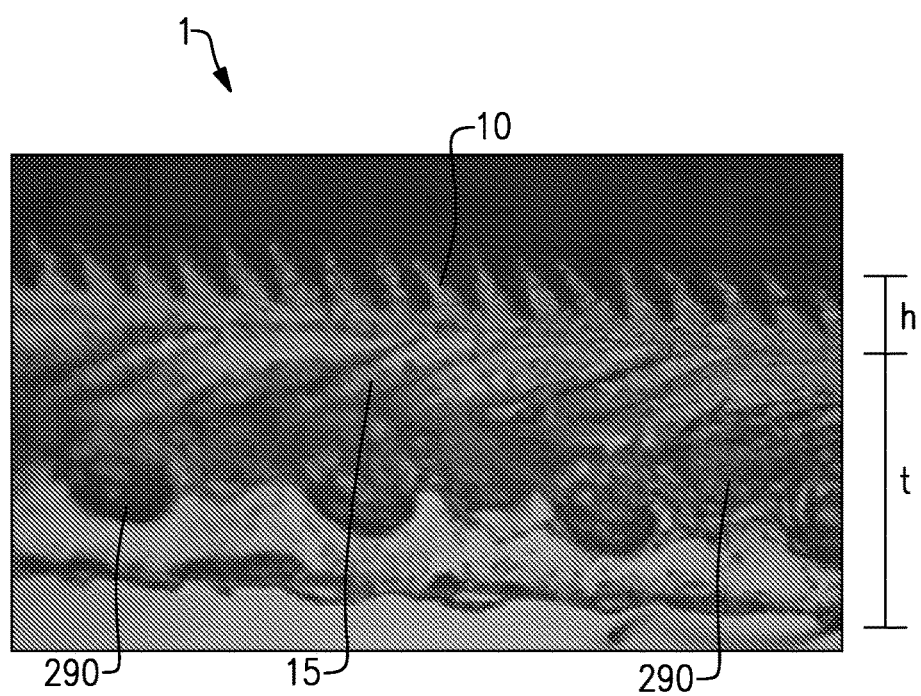
FIG. 28B illustrates another embodiment of a micro-scale dry adhesive structure incorporating a fabric mesh.

FIGS. 28A and 28B are cross sectional micrographs of a polyurethane mesh 290 embedded in the backing 15 of a micro-scale dry adhesive structure 1. In FIG. 28A, the microwedges 10 have heights h of about 100 µm and the backing 15 has a thickness t of between about 250 µm and about 300 µm. In FIG. 28B, the microwedges 10 also have heights h of about 100 µm and the backing 15 has a thickness t of about 425 µm. It is to be understood that these dimensions are examples only and that micro-scale dry adhesive structures including embedded fibers or fiber meshes may have different dimensions than these.

Figure 29:
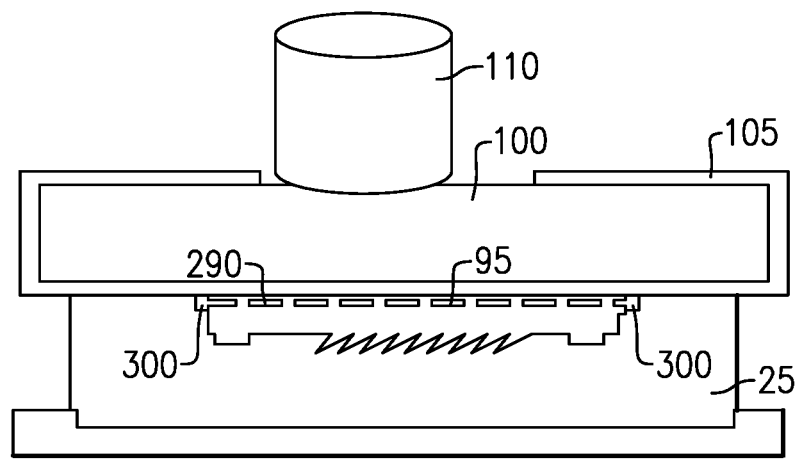
FIG. 29 illustrates a mold for casting a micro-scale dry adhesive structure including a frame holding a fabric mesh.
Figure 30:
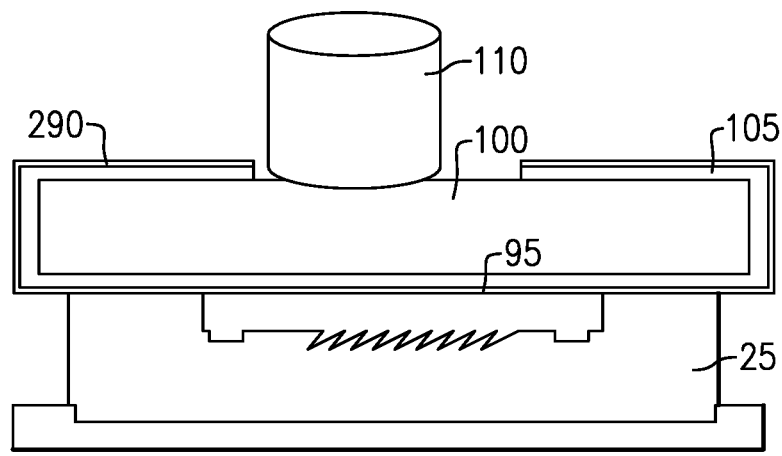
FIG. 30 illustrates a rigid plate wrapped in a release layer and a fabric mesh disposed on a mold including material being cast into a micro-scale dry adhesive structure.

In some embodiments, a fabric material or mesh 290 may be included in a mold 25 with liquid material 95 used to cast a micro-scale dry adhesive structure and the fabric material or mesh 290 may be secured in the backing 15 of the micro-scale dry adhesive structure as the liquid material 95 cures. The fabric material or mesh 290 may be a portion of an article of clothing, for example, a glove, or material that is to be used to form an article of clothing, for example, a glove. In some embodiments, the fabric material or mesh 290 is supported on a frame 300 in the mold to keep the fabric material or mesh 290 flat. (FIG. 29.) In other embodiments, the fabric material or mesh 290 is wrapped around the rigid plate 100 along with the release material 105 and pressed into the material 95 of the uncured backing 15 by the rigid plate 100 and/or weight 110. (FIG. 30.) In other embodiments, a fabric material or mesh 290 may be adhered to a previously formed micro-scale dry adhesive structure, for example, by depositing a liquid adhesive including the fabric material or mesh 290 on the backing 15 of the previously formed micro-scale dry adhesive structure and allowing the adhesive to cure. In some embodiments the adhesive is formed from the same material as the material of the previously formed micro-scale dry adhesive structure. In some embodiments, the backing 15 of the previously formed micro-scale dry adhesive structure is activated, for example, with $O_2$ plasma, prior to depositing the liquid adhesive including the fabric material or mesh 290 on the backing 15 to improve adherence.

Figure 31:
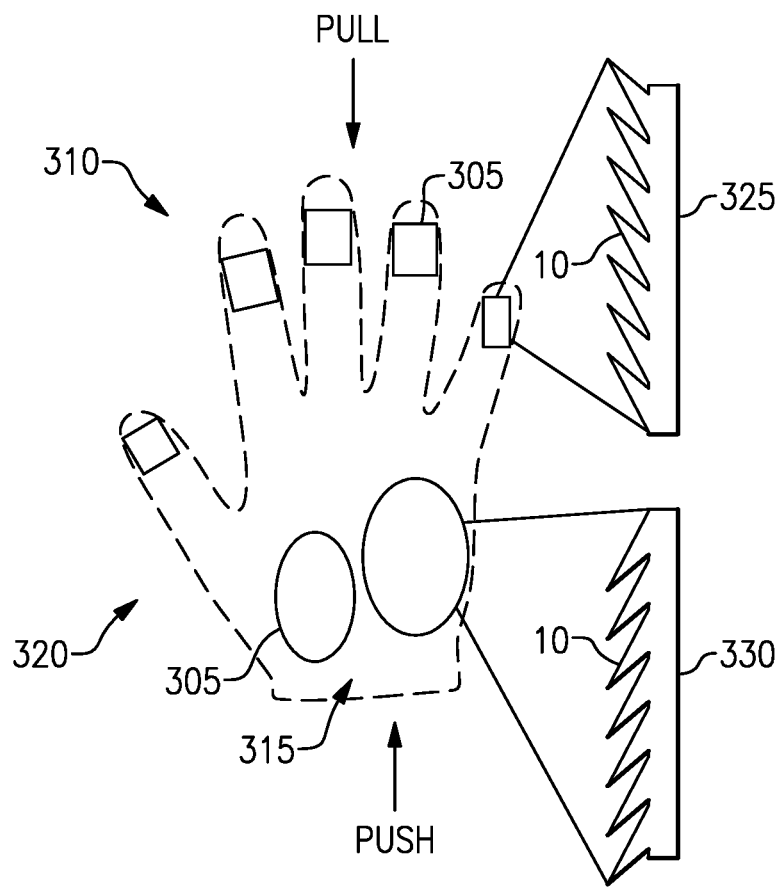
FIG. 31 illustrates patches including embodiments of a micro-scale dry adhesive structure coupled to a glove.

In some embodiments, micro-scale dry adhesive structures including embedded fibers or fiber meshes are formed into or attached to an article of clothing. The article of clothing may be, for example, a glove. Attaching the micro-scale dry adhesive structures including embedded fibers or fiber meshes to the article of clothing may include coupling the micro-scale dry adhesive structures including embedded fibers or fiber meshes to the article of clothing with a mechanical fastener, for example, with hook and loop fasteners and/or by sewing the micro-scale dry adhesive structures to the article of clothing, and/or by molding the adhesive/friction-enhancing structures directly onto the fabric of the article of clothing, either before or after the article of clothing is sewn or formed. Attaching the micro-scale dry adhesive structures to the article of clothing may include coupling the micro-scale dry adhesive structures to the article of clothing with a chemical agent. The chemical agent may include an adhesive, for example, an epoxy, one of the LOCTITE® brand adhesives, cyanoacrylate super glue, or other adhesives known in the art. Attaching the micro-scale dry adhesive structures to the article of clothing may include welding the micro-scale dry adhesive structures to the article of clothing. In some embodiments, a base of the backing 315 of a micro-scale dry adhesive structure may be partially melted and/or a liquid polymer similar or the same as the material of the micro-scale dry adhesive structure may be applied to the base of the backing 315 and the backing 315 pressed against a portion of a glove such that the partially melted or liquid polymer may seep into the fabric of the glove and seal to the glove upon curing. In some embodiments, a fabric material including micro-scale dry adhesive structures with embedded fibers or fiber meshes may be fabricated and cut to dimensions appropriate for a glove and sewn together using conventional sewing methods. For knit gloves micro-scale dry adhesive structures including embedded fibers or fiber meshes may be sewn and/or adhered with an adhesive to desired locations on the knit glove. For example, as illustrated in FIG. 31, one or more patches of material 305 including micro-scale dry adhesive structures with embedded fibers or fiber meshes may be adhered or sewn to finger portions 310 and/or to heel portions 315 of a glove 320.

Orientation of microstructures on the micro-scale dry adhesive structure patches 305 may be selected based on locations of the patches 305 and expected forces that would be applied to the particular locations. For example, in embodiments of micro-scale dry adhesive structure patches 305 including microwedge structures 10, the microwedge structures 10 may provide for a greater degree of adhesion and/or friction enhancement when the microwedges 10 are angled against the expected direction of force. This orientation would cause the microwedges 10 to bend downward and contact a surface against which the force is applied with a greater amount of surface area than if the microwedges 10 were oriented in a different direction. For example, as illustrated in FIG. 31, finger portions 310 of a glove 320 are often used to pull on a surface of a material. Accordingly, microwedges 10 in the patches 305 on the finger portions 310 of the glove 320 may preferably be oriented with the microwedges 10 angled toward the ends of the finger portions, as shown at 325. Conversely, heel portions 315 of a glove 320 are often used to exert a pushing force on a surface of an object. Accordingly, microwedges 10 in the patches 305 on the heel portions 315 of the glove 320 may preferably be oriented with the microwedges 10 angled toward the wrist, as shown at 330. In some embodiments, in addition to or as an alternative to providing microwedges 10 with different orientations in patches 305 coupled to finger portions 310 and heel portions 315 of a glove 320, the patches 305 coupled to the finger portions 310 may be provided with differently sized or differently shaped micro-element structures than those provided in patches coupled to the heel portions 315 of the glove 320.

Figure 32:
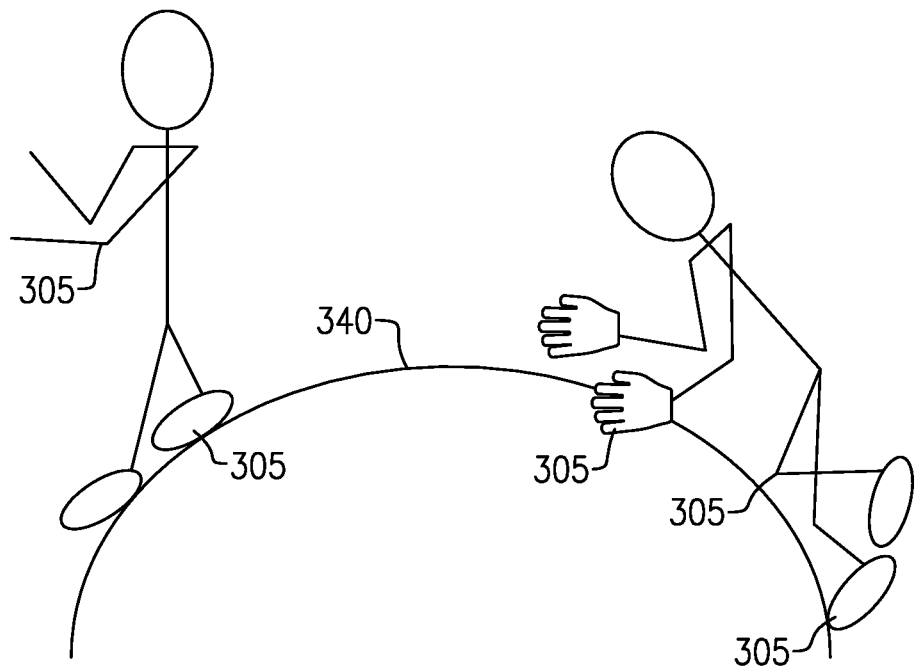
FIG. 32 illustrates alternative locations wearable items where patches including embodiments of a micro-scale dry adhesive structure may be coupled.
Figure 33A:
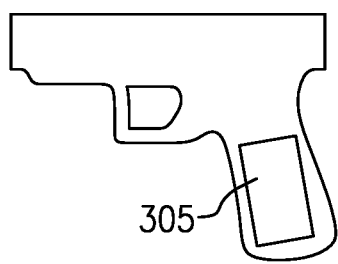
FIG. 33A illustrates a handgun with a hand grip having a patch including an embodiments of a micro-scale dry adhesive structure coupled thereto.
Figure 33B:
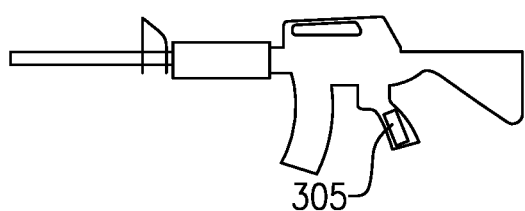
FIG. 33B illustrates a rifle with a hand grip having a patch including an embodiments of a micro-scale dry adhesive structure coupled thereto.
Figure 34:
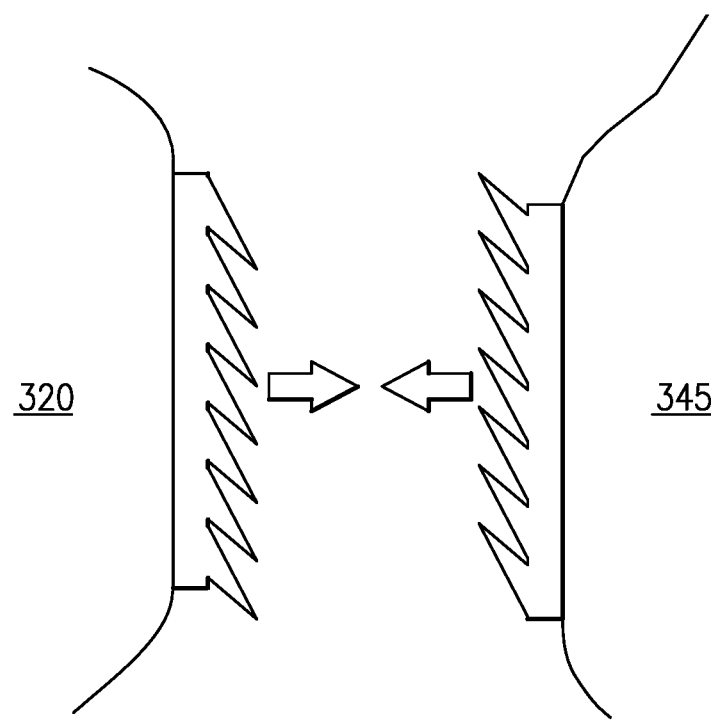
FIG. 34 illustrates complimentary micro-scale dry adhesive structures coupled to a glove and to an object.

In other embodiments patches 305 including of micro-scale dry adhesive structures may be coupled, for example, by sewing or adhesive bonding to other articles of clothing or objects. For example, as shown in FIG. 32, in addition to or as an alternative to being coupled to gloves, patches 305 may be coupled to knee pads, shoe tips, shoe soles, and/or elbow pads. The placement of patches 305 on knee pads, shoe tips, shoe soles, and/or elbow pads may assist a user in climbing over an otherwise smooth and slippery obstacle 340. Patches 305 including of micro-scale dry adhesive structures may be coupled to, for example, the grips of guns or rifles, as illustrated in FIG. 33 to provide a high friction grips. Other objects, for example, sports equipment such as hockey sticks, baseball bats, lacrosse sticks, etc., may also, in some embodiments, have patches 305 including of micro-scale dry adhesive structures coupled to their handles to provide for better grips on these object by users of the objects. In further embodiments a glove 320 may be provided with patches 305 including micro-scale dry adhesive structures in a first orientation and an object 345 to be gripped may be provided with patches 305 including micro-scale dry adhesive structures in an orientation opposite to the first orientation so that as a user grips the object 345 with the glove 320 the micro-elements on the respective patches 305 interlock to provide a secure grip on the object 345.

Figure 35:
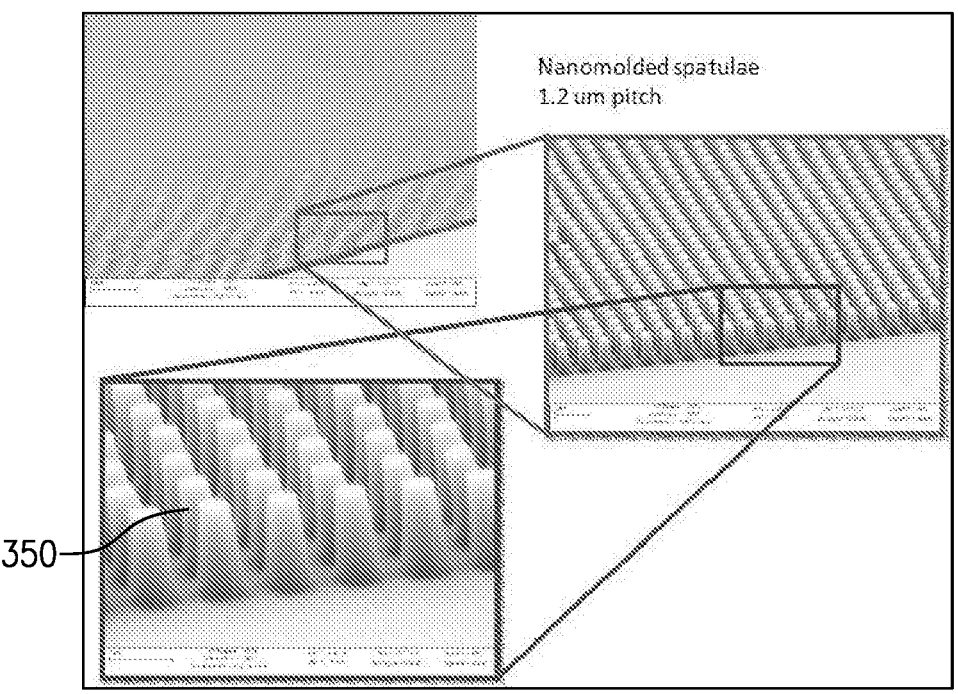
FIG. 35 illustrates an embodiment of a micro-pillar array that may be utilized as a micro-element in embodiments of a micro-scale dry adhesive structure.
Figure 36:
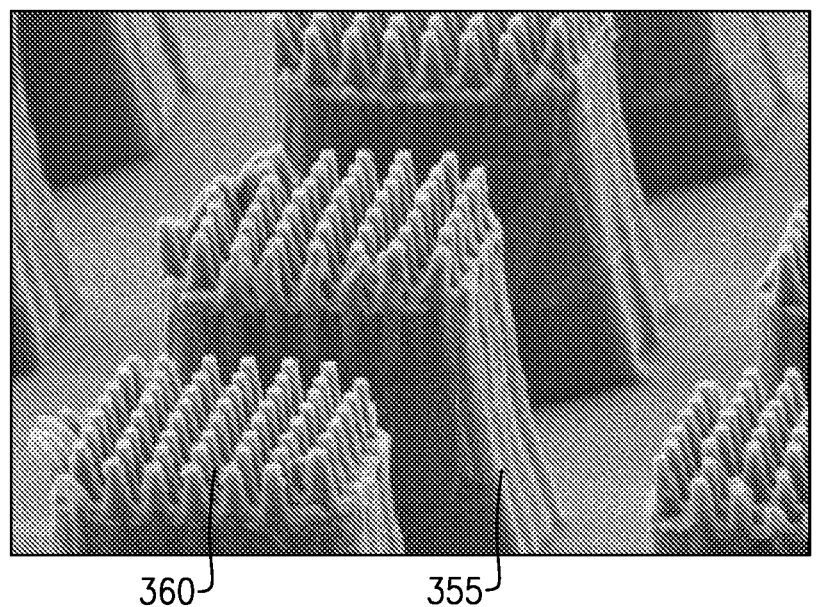
FIG. 36 illustrates an embodiment of a micro-tower array that may be utilized as a micro-element in embodiments of a micro-scale dry adhesive structure.
Figure 37:
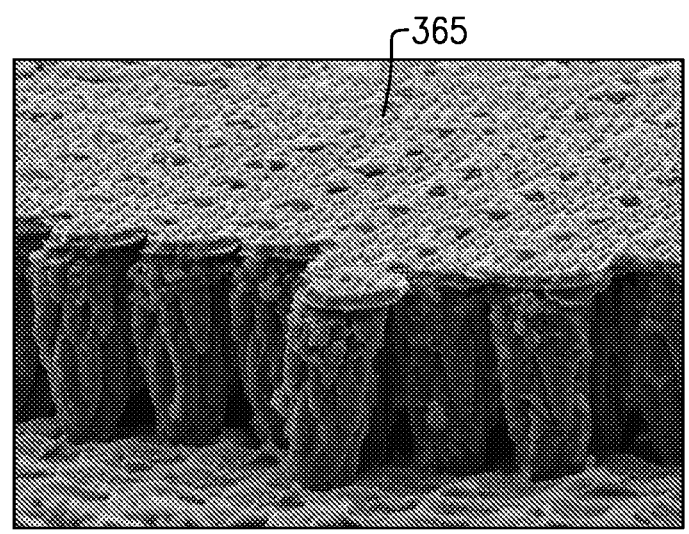
FIG. 37 illustrates an embodiment of a micro-column array that may be utilized as a micro-element in embodiments of a micro-scale dry adhesive structure.
Figure 38:
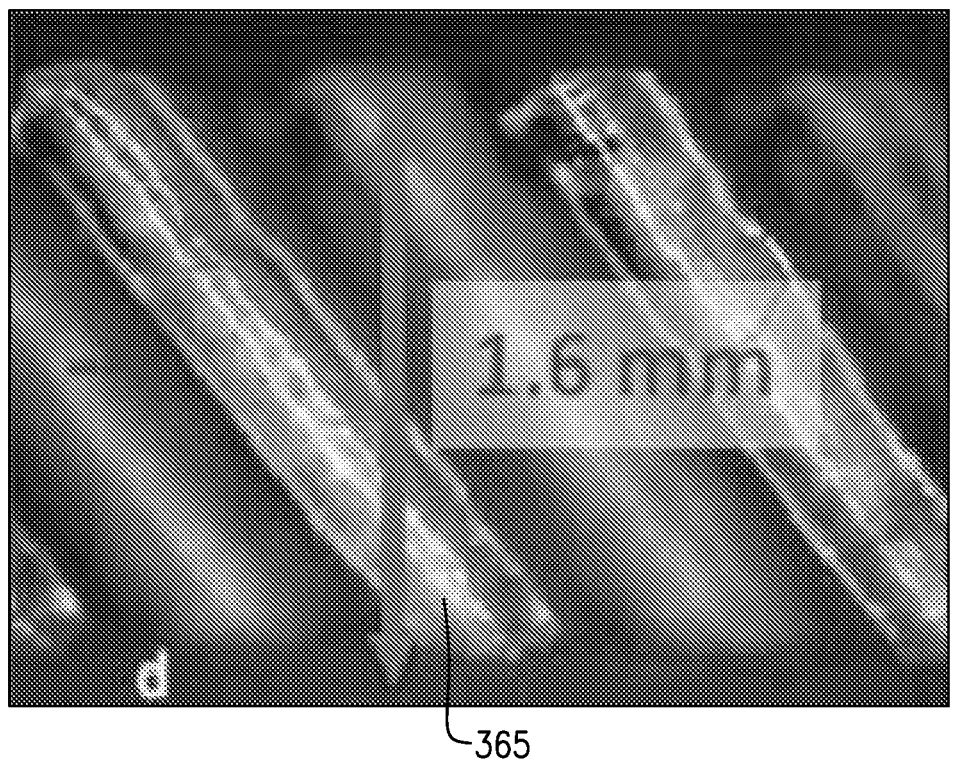
FIG. 38 illustrates another embodiment of a micro-column array that may be utilized as a micro-element in embodiments of a micro-scale dry adhesive structure.

Although the micro-scale dry adhesive structures disclosed herein have been described with reference to microwedge adhesive structures, it should be appreciated that in various embodiments alternative or additional micro-element morphologies may be utilized in the embodiments of the micro-scale dry adhesive structures disclosed herein, for example, micro-pillars 350 (FIG. 35), micro-towers 355, optionally including micro-pillars 360 extending from upper surfaces (FIG. 36), or micro-columns 365 oriented substantially normal to a substrate (FIG. 37) or at an angle relative to a substrate (FIG. 38).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of casting a micro-scale structure in a mold, the method comprising:
   providing a mold including a negative pattern for the micro-scale structure in a first cavity in an upper surface of the mold, the micro-scale structure including a plurality of micro-scale elements and one or more standoffs;
   depositing a casting material on the negative pattern;
   disposing a fabric mesh in the casting material in the first cavity;
   curing the casting material;
   forming smoothness enhancing structures on upper edges of the plurality of micro-scale elements, forming the smoothness enhancing structures on the upper edges of the plurality of micro-scale elements comprising:
   depositing a layer of a liquid polymer on an upper surface of an inking plate;
   placing the micro-scale structure on the inking plate in contact with the liquid polymer;
   placing the one or more standoffs in contact the upper surface of the inking plate; and
   removing the micro-scale structure from the inking plate.

2. The method of claim 1, wherein providing the mold further comprises providing the mold with standoff cavities disposed in the first cavity outside of the negative pattern for the micro-scale structure.

3. The method of claim 1, wherein disposing the fabric mesh in the casting material includes disposing a frame holding the fabric mesh in the first cavity.

4. The method of claim 1, further comprising securing a portion of the mold to a base plate with a retainer contacting side walls of the portion of the mold and having a tapered surface corresponding to a taper of the side walls.

5. The method of claim 1, further comprising defining the negative pattern for the micro-scale structure by a process including:
   applying a friction reducing agent to the first cavity;
   machining a micro-scale pattern in the first cavity; and
   washing the friction reducing agent from the first cavity.

6. The method of claim 1, further comprising at least partially coating the upper surface with a release agent.

7. The method of claim 1, further comprising applying pressure to the casting material during curing of the casting material.

8. The method of claim 7, further comprising pressing the fabric mesh into the casting material.

9. The method of claim 1, further comprising:
   removing the micro-scale structure from the mold after the casting material has cured; and
   inspecting the mold after removing the micro-scale structure.

10. The method of claim 9, further comprising reconditioning the mold responsive to determining that the mold has become damaged.

11. The method of claim 1, further comprising treating the upper edges of the plurality of micro-scale elements with a plasma prior to placing the micro-scale structure on the inking plate.

12. The method of claim 1, further comprising filtering the liquid polymer prior to depositing the layer of the liquid polymer on the upper surface of the inking plate.

13. The method of claim 1, further comprising placing the micro-scale structure including the liquid polymer disposed on the upper edges of the plurality of micro-scale elements on a mesa plate, and curing the liquid polymer while the upper edges of the plurality of micro-scale elements are in contact with the mesa plate.

14. The method of claim 1, further comprising:

removing the micro-scale structure from the mold after the casting material has cured; and coupling the micro-scale structure to an object.

15. The method of claim 14, wherein the object is an article of clothing and the method comprises coupling the micro-scale structure to the article of clothing with a mechanical fastener.

16. The method of claim 15, comprising sewing the micro-scale structure to the article of clothing.

17. The method of claim 16, wherein the object is a glove.

18. The method of claim 14, wherein the object is a glove and coupling the micro-scale structure to the glove includes adhering the micro-scale structure to the glove with an adhesive.

19. The method of claim 14, wherein the object is a glove and coupling the micro-scale structure to the glove includes welding the micro-scale structure to the glove.

20. The method of claim 14, wherein the object is a glove and coupling the micro-scale structure to the glove includes coupling a plurality of the micro-scale structures to the glove, at least one of the plurality of micro-scale structures including micro-elements disposed at an orientation different from an orientation of micro-elements of a second of the plurality of micro-scale structures.

21. The method of claim 1, further comprising:

removing the micro-scale structure from the mold after the casting material has cured; and forming the micro-scale structure into an article of clothing.

22. The method of claim 21, wherein the article of clothing is a glove.

23. The method of claim 1, wherein the fabric mesh is a portion of an article of clothing.

24. The method of claim 1, wherein the fabric mesh is a portion of a glove.

* * * * *

UNITED STATES PATENT AND TRADEMARK OFFICE
CERTIFICATE OF CORRECTION

PATENT NO. : 10,791,779 B2  
APPLICATION NO. : 15/534907  
DATED : October 6, 2020  
INVENTOR(S) : David J. Carter et al.

Page 1 of 1

It is certified that error appears in the above-identified patent and that said Letters Patent is hereby corrected as shown below:

In the Specification

Column 1, Line 5, delete "APPLICATION".  
Column 10, Line 38, delete "CONAPDXY®" and insert -- CONAPOXY® --.  
Column 11, Line 8, delete "CONAPDXY®" and insert -- CONAPOXY® --.

Signed and Sealed this  
First Day of December, 2020

Andrei Iancu  
*Director of the United States Patent and Trademark Office*